(12) United States Patent
Ahn et al.

(10) Patent No.: US 9,836,803 B2
(45) Date of Patent: Dec. 5, 2017

(54) NETWORK SYSTEM

(75) Inventors: Junho Ahn, Changwon-si (KR);
Yanghwan Kim, Changwon-si (KR);
Hoonbong Lee, Changwon-si (KR);
Koonseok Lee, Changwon-si (KR);
Sangseog Kang, Changwon-si (KR);
Sunhee Kang, Changwon-si (KR);
Younghyun Kang, Changwon-si (KR);
Youngtae Kwon, Changwon-si (KR);
Jaekuk Kwon, Changwon-si (KR);
Byeongho Min, Changwon-si (KR);
Kicheol Shin, Changwon-si (KR);
Dongchun Shin, Changwon-si (KR);
Taeyun Lim, Changwon-si (KR);
Shinjae Jeong, Changwon-si (KR);
Kyungeun Jo, Changwon-si (KR);
Juyoung Cha, Changwon-si (KR);
Sungyong Heo, Changwon-si (KR)

(73) Assignee: LG ELECTRONICS INC, Seoul (KR)

( * ) Notice: Subject to any disclaimer, the term of this patent is extended or adjusted under 35 U.S.C. 154(b) by 1305 days.

(21) Appl. No.: 13/806,924

(22) PCT Filed: Jun. 24, 2011

(86) PCT No.: PCT/KR2011/004640
§ 371 (c)(1),
(2), (4) Date: May 7, 2013

(87) PCT Pub. No.: WO2011/162576
PCT Pub. Date: Dec. 29, 2011

(65) Prior Publication Data
US 2013/0274938 A1 Oct. 17, 2013

(30) Foreign Application Priority Data

Jun. 25, 2010 (KR) .................. 10-2010-0060592
Jun. 25, 2010 (KR) .................. 10-2010-0060593
(Continued)

(51) Int. Cl.
*G06Q 50/06* (2012.01)
*H02J 3/14* (2006.01)
(Continued)

(52) U.S. Cl.
CPC ............. *G06Q 50/06* (2013.01); *H02J 3/14* (2013.01); *H02J 13/0055* (2013.01);
(Continued)

(58) Field of Classification Search
CPC ........ G06Q 50/06; H02J 3/14; H02J 13/0055; H02J 2003/143; H02J 2003/146;
(Continued)

(56) References Cited

U.S. PATENT DOCUMENTS 9,035,598 B2 * 5/2015 Ukita .................. H02J 3/008
320/107
2007/0119637 A1 * 5/2007 Yajima ................ B60K 6/445
180/65.1
(Continued)

FOREIGN PATENT DOCUMENTS

JP 2001-231169 A 8/2001
JP 2002051462 A 2/2002
(Continued)

*Primary Examiner* — Jennifer L Norton
(74) *Attorney, Agent, or Firm* — Dentons US LLP

(57) ABSTRACT

A network system is provided. The network system includes: at least one component selected from an energy receiving unit receiving energy and an energy management unit managing the energy receiving unit. The energy receiving unit or the energy management unit receives energy rate related
(Continued)

information; an energy usage amount or a usage rate of when the component is controlled on the basis of at least the energy rate related information is less than that of when the component is controlled without the basis of at least energy rate related information; if the energy rate related information is high cost information, a function of one component constituting the energy receiving unit is limited; and an operating time or an output of the energy receiving unit is adjusted in correspondence to the limited function of one component.

35 Claims, 33 Drawing Sheets

(30) Foreign Application Priority Data

| | | |
|---|---|---|
| Jun. 26, 2010 | (KR) | 10-2010-0060891 |
| Jun. 26, 2010 | (KR) | 10-2010-0060898 |
| Jun. 26, 2010 | (KR) | 10-2010-0060900 |
| Nov. 26, 2010 | (WO) | PCT/IB2010/003388 |

(51) Int. Cl.
  *H02J 13/00* (2006.01)
  *H04L 12/12* (2006.01)
  *H04L 12/28* (2006.01)

(52) U.S. Cl.
  CPC .......... *H04L 12/12* (2013.01); *H04L 12/2803* (2013.01); *H02J 2003/143* (2013.01); *H02J 2003/146* (2013.01); *Y02B 60/32* (2013.01); *Y02B 60/34* (2013.01); *Y02B 70/325* (2013.01); *Y02B 70/3225* (2013.01); *Y02B 70/3266* (2013.01); *Y04S 20/222* (2013.01); *Y04S 20/224* (2013.01); *Y04S 20/228* (2013.01); *Y04S 20/242* (2013.01)

(58) Field of Classification Search
  CPC ..... H04L 12/12; H04L 12/2803; Y02B 60/32; Y02B 60/34; Y02B 70/3225; Y02B 70/325; Y02B 70/3266; Y04S 20/222; Y04S 20/224; Y04S 20/228; Y04S 20/242
  See application file for complete search history.

(56) References Cited

U.S. PATENT DOCUMENTS

| | | | | |
|---|---|---|---|---|
| 2010/0088261 A1* | 4/2010 | Montalvo | ................ | H02J 3/14 706/15 |
| 2010/0146712 A1* | 6/2010 | Finch | ................ | G06Q 50/06 8/137 |
| 2010/0167659 A1* | 7/2010 | Wagner | ................ | G01D 4/008 455/67.11 |
| 2010/0292855 A1* | 11/2010 | Kintner-Meyer | ......... | B60L 1/08 700/291 |
| 2010/0305890 A1* | 12/2010 | Huang | ............... | G06Q 10/0637 702/62 |
| 2011/0098869 A1* | 4/2011 | Seo | ................ | G01D 4/004 700/296 |
| 2011/0208365 A1* | 8/2011 | Miller | ................ | G06Q 50/06 700/291 |
| 2011/0264605 A1* | 10/2011 | Park | ................ | G06Q 10/06 705/412 |
| 2013/0297084 A1* | 11/2013 | Kubota | ................ | H01M 10/44 700/286 |
| 2016/0232458 A1* | 8/2016 | Naito | ................ | G06Q 50/06 |

FOREIGN PATENT DOCUMENTS

| | | | |
|---|---|---|---|
| JP | 2008-306832 A | 12/2008 | |
| KR | 10-2002-0041928 A | 6/2002 | |
| KR | 10-2003-0036286 A | 5/2003 | |
| KR | 10-2006-0039171 A | 9/2006 | |
| KR | 10-0701110 B1 | 3/2007 | |
| KR | 10-2007-0062006 A | 6/2007 | |
| KR | 1020080107939 A | 12/2008 | |
| KR | 10-2009-0085920 A | 8/2009 | |
| WO | 2010-031012 A1 | 3/2010 | |
| WO | WO 2010042550 A2 * | 4/2010 | .......... B60L 11/1824 |

* cited by examiner

NETWORK SYSTEM

CROSS-REFERENCE TO RELATED APPLICATIONS

This application is a 35 USC §371 National Stage entry of International Application No. PCT/KR2011/004640 filed on Jun. 24, 2011, and claims priority of Korean Application No. 10-2010-0060593 filed on Jun. 25, 2010, Korean Application No. 10-2010-0060592 filed on Jun. 25, 2010, Korean Application No. 10-2010-0060898 filed on Jun. 26, 2010, Korean Application No. 10-2010-0060891 filed on Jun. 26, 2010, Korean Application No. 10-2010-0060900 filed on Jun. 26, 2010 and PCT/IB/2010/003388 filed on Nov. 26, 2010, all of which are incorporated by reference in their entirety herein.

TECHNICAL FIELD

The present disclosure relates to a network system.

BACKGROUND ART

A provider has simply provided energy sources such as electricity, water and gas while a consumer has simply used the supplied energy sources. This makes difficult to realize efficient management in terms of the generation, distribution and use of energy. Therefore, a network system for effectively managing energy is in need.

DISCLOSURE OF THE INVENTION

Technical Problem

Embodiments provide a network system capable of effectively managing energy sources.

Technical Solution

In one embodiment, a network system comprises: one or more of an energy receiving component receiving energy and an energy management component controlling the energy demanding component; and wherein the energy receiving unit or the energy management unit receives information related to energy cost; an energy usage amount or a usage cost of when the component is controlled on the basis of at least information related to energy cost is less than that of when the component is controlled without the basis of at least information related to energy cost; wherein the network system further comprises: an energy storage unit for storing energy to be supplied to one of the energy receiving component and the energy management component.

The details of one or more embodiments are set forth in the accompanying drawings and the description below. Other features will be apparent from the description and drawings, and from the claims.

Advantageous Effects

According to embodiments, an energy source can be efficiently produced, used, distributed, and stored, thus enabling the effective management of the energy source.

Also, by using energy information, in-house electric products can be driven and controlled. The energy usage cost and power consumption can be reduced.

BEST MODE FOR CARRYING OUT THE INVENTION

Reference will now be made in detail to the embodiments of the present disclosure, examples of which are illustrated in the accompanying drawings.

Reference will now be made in detail to the embodiments of the present disclosure, examples of which are illustrated in the accompanying drawings.

Figure 1:
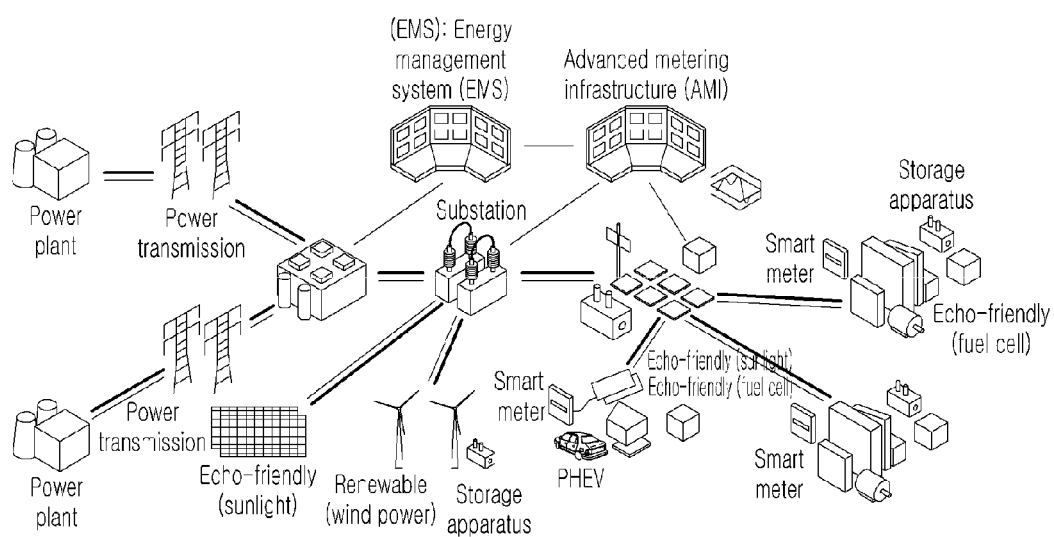
FIG. 1 is a view schematically showing an example of a network system according to the present disclosure.

FIG. 1 is a view schematically showing an example of a network system according to the present disclosure.

The network system is a system for managing an energy source such as electricity, water or gas. The energy source means one of which amount generated or used can be metered. Therefore, even a source not mentioned above may be used as the energy source. Hereinafter, electricity will be described as an example of the energy source, and details of this specification may be identically applied to other energy sources.

Referring to FIG. 1, a network system according to an embodiment includes a power plant for producing electricity. The power plant may include a power plant for producing electricity through a thermal power generation or nuclear power generation and a power plant using water power, sunlight power, wind power or the like which is eco-friendly energy.

The electricity produced in the power plant is transmitted to a sub-control center through a power transmission line, and the sub-control center transmits the electricity to a substation so that the electricity is distributed to customers such as houses or offices.

Electricity produced by the eco-friendly energy is also transmitted to the substation so as to be distributed to each of the customers. The electricity transmitted from the substation is distributed to each of the offices or houses through electricity power storage, or is directly distributed to each of the offices or houses.

In a house using a home area network (HAN), electricity may be produced by itself through sunlight, fuel cells built in a plug-in hybrid electric vehicle (PHEV), or the like. Also, the produced electricity may be stored or distributed, or surplus electricity may be resold to the outside world.

The network system may include a smart meter for detecting the amount of electricity used in each customer (house, office or the like) in real time, and an advanced metering infrastructure (AMI) for metering the amount of electricity used in a plurality of customers.

The network system may further include an energy management system (EMS) for managing energy. The EMS may generate information on operations of one or more components with respect to energy (production of energy, distribution of energy, usage of energy, storage of energy, and the like). The EMS may generate at least a command for the operations of the components.

In this specification, a function or solution performed by the EMS may be referred to as an energy management function or energy management solution.

In the network system, one or more EMSs may be provided as a separate configuration, or the EMS may be included as an energy management function or energy management solution in one or more components.

Figure 2:
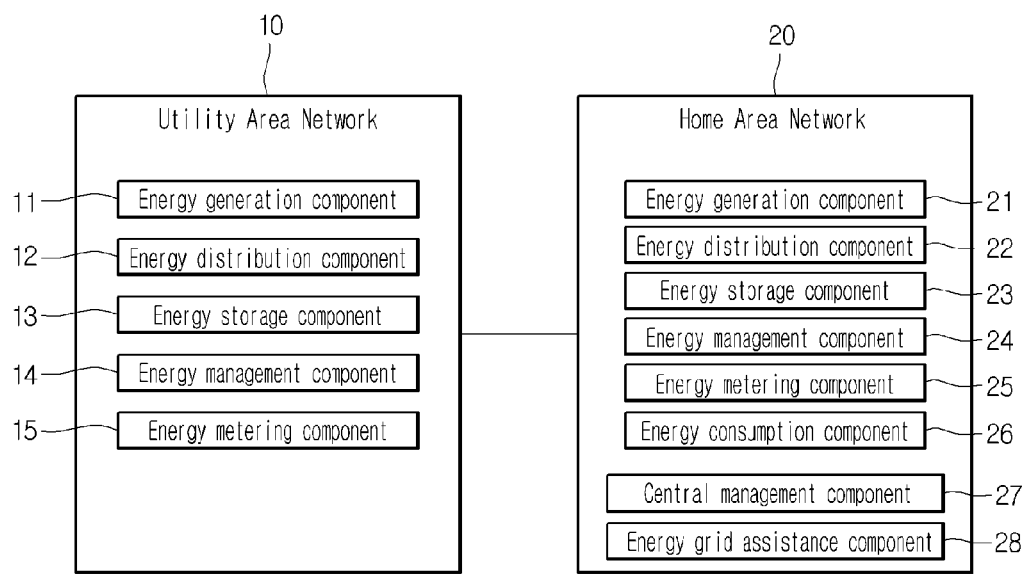
FIG. 2 is a block diagram schematically showing an example of the network system according to the present disclosure.

FIG. 2 is a block diagram schematically showing an example of the network system according to the present disclosure.

Referring to FIGS. 1 and 2, the network system according to the present disclosure is configured by a plurality of components. For example, the components of the network system are a power plant, a substation, a sub-control center, an EMS, electric home appliances, a smart meter, a storage battery, a web server, an AMI, a home server, and the like.

In the present disclosure, each of the components may be configured by a plurality of sub-components. As an example, in a case of one component is an electric home appliance, sub-components may be a microcomputer (MICOM), a heater, a display and the like. That is, all that perform a specific function may be components in the present disclosure, and such components constitute the network system of the present disclosure. Two components may communicate with each other by means of a communication unit. One network may be one component or may be configured by a plurality of components.

In this specification, the network system in which communication information is related to an energy source may be referred to as an energy grid.

A network system according to an embodiment may include a utility area network (UAN) 10 and a home area network (HAN) 20. The UAN 10 and the HAN 20 may perform wired or wireless communication by means of a communication unit, and may perform two-way communication.

In this specification, the term "home" means not only a household as a lexical meaning but also a group in which specific components such as buildings or companies gather. Also, the term "utility" means a group in which specific components outside the home gather.

The UAN 10 includes an energy generation component 11 for generating energy, an energy distribution component 12 for distributing or transmitting energy, an energy storage component 13 for storing energy, an energy management component 14 for managing energy, and an energy metering component 15 for metering information related to energy.

In a case where one or more components that constitute the UAN 10 consume energy, the components that consume the energy may be energy consumption components.

The energy consumption component is a component corresponding to the energy consumption component 26 that constitutes the HAN 20. The energy consumption component may be the same component as the energy consumption component 26 or may be another component distinguished from the energy consumption component 26.

The energy generation component 11 may be a power plant as an example. The energy distribution component 12 distributes or transmits energy generated in the energy generation component 11 and/or energy stored in the energy storage component 13 to the energy consumption component 26 that consumes the energy. The energy distribution component 12 may be a power transmitter, substation, sub-control center, or the like.

The energy storage component 13 may be a storage battery, and the energy management component 14 generates information for driving one or more of the energy generation component 11, the energy distribution component 12, the energy storage component 13 and the energy consumption component 26, related to energy. The energy management component 14 may generate at least a command for the operation of a specific component.

The energy management component 14 may be an EMS. The energy metering component 15 may meter information related to the generation of energy, the distribution of energy, the usage of energy, the storage of energy, and the like. The energy metering component 15 may be an AMI as an example. The energy management component 14 may be a separate configuration, or may be included in another component as an energy management function.

The UAN 10 may communicate with the HAN 20 by a terminal component (not shown). That is, information generated or transferred in a specific component that constitutes the UAN 10 may be transmitted to the HAN 20 through the terminal component, or information generated or transferred in another component that constitutes the HAN 20 may be received to the UAN 10 through the terminal component. The terminal component may be a gate way as an example. The terminal component may be provided to one or more of the UAN 10 and the HAN 20.

The terminal component may be a component necessary for transmitting/receiving information between the UAN and the HAN.

Two components that constitute the UAN 10 may communicate with each other by means of a communication unit.

The HAN 20 includes an energy generation component 21 for generating energy, an energy distribution component 22 for distributing energy, an energy storage component 23 for storing energy, an energy management component 24 for managing energy, an energy metering component 25 for metering information related to energy, an energy consumption component 26 for consuming energy, a central management component 27 for controlling a plurality of components, and an energy grid assistance component 28.

The energy generation component 21 may be a home power generator, and the energy storage component 23 may be a storage battery. The energy management component 24 may be an EMS. As an example, the energy generation component 21 may be a solar cell, a fuel cell, a wind power generator, a power generator using subterranean heat, a power generator usng seawater, or the like.

The energy storage component 23 may perform storage using energy generated from the energy generation component 21. Therefore, in view of the use of energy, the energy storage component 23 and the energy generation component 11 may be an energy using component that uses energy together with the energy consumption component 26. That is, the energy using component may include at least an energy consumption component, an energy generation component and an energy storage component. In a case where the energy management component uses energy, it may be included in the energy using component.

In view of the supplied energy, the energy storage component 23, the energy consumption component and the energy generation component 11 may be an energy supplied component to which energy is supplied.

The energy metering component 25 may meter information related to the generation of energy, the distribution of energy, the usage of energy, the storage of energy, and the like. The energy metering component 25 may be a smart meter as an example. The energy consumption component 26 may be, as an example, an electric home appliance or a heater, motor, display or the like, which constitutes the electric home appliance. In this embodiment, there is no limitation in the kind of the energy consumption component 26.

Specifically, the energy generation component 21 may be another component of the UAN 10, which generates energy to be supplied to the HAN 20.

The energy management component 24 may be provided as a separate configuration or may be included in another component as an energy management function. As an example, the energy management function may be performed by a control component that controls the energy consumption component. In a case where the control component performs the energy management function, it may be an energy management component.

Specifically, the energy management component 14 that constitutes the UAN 10 or the energy management component 24 that constitutes the HAN 20 may be built in one or more of the plurality of components that constitute the networks 10 and 20, or may exist as a separate device. The energy management component 24 may recognize the information related to energy (energy information) and the state information of a component controlled by the energy management component 24.

The energy generation component 21, the energy distribution component 22 and the energy storage component 23 may be individual components, or may constitute a single component.

The central management component 27 may be, as an example, a home server for controlling a plurality of electric home appliances.

The energy grid assistance component 28 is a component having a primary function while performing an additional function for the energy grid. For example, the energy grid assistance component 28 may be a web service providing component (e.g., a computer or the like), mobile device, television, or the like.

The mobile device may receive energy information or additional information (described later), and control the operation of at least the energy consumption component 26 using the received information.

Two components that constitute the HAN 20 may communicate with each other by means of a communication unit.

The energy generation components 11 and 21, the energy distribution components 12 and 22, the energy storage components 13 and 23, the energy management components 14 and 24, the energy metering components 15 and 25, the energy consumption component 26 and the central management component may independently exist, or two or more of them may constitute a single component.

For example, the energy management component 14 or 24, the energy metering component 15 or 25 and the central management component 27 may exist as single components so as to be configured as a smart meter, an EMS and a home server, which perform their functions, respectively. Alternatively, the energy management component 14 or 24, the energy metering component 15 or 25 and the central management component 27 may constitute a single system.

When a function is performed, it may be sequentially performed in a plurality of components and/or communication units. For example, an energy management function may be sequentially performed in the energy management component, the energy metering component and the energy consumption component.

In the network system, a plurality of UANs 10 may communicate with a single HAN 20, and a single UAN 10 may communicate with a plurality of HANs 20.

The component with a specific function, which constitutes the UAN and the HAN, may be configured as a plurality of components. For example, the energy generation component, the energy consumption component or the like may be configured as a plurality of components.

In this specification, each of the components that constitute the UAN and HAN may having a function performing component that performs its own function, or each of the components itself may be a function performing component.

As an example, in a case where the energy consumption component is an electric product, the electric product has a function performing component such as a heater, compressor, motor or display. As another example, in a case where the energy consumption component is a heater, compressor, motor, display or the like, the energy consumption component itself is a function performing component.

Figure 3:
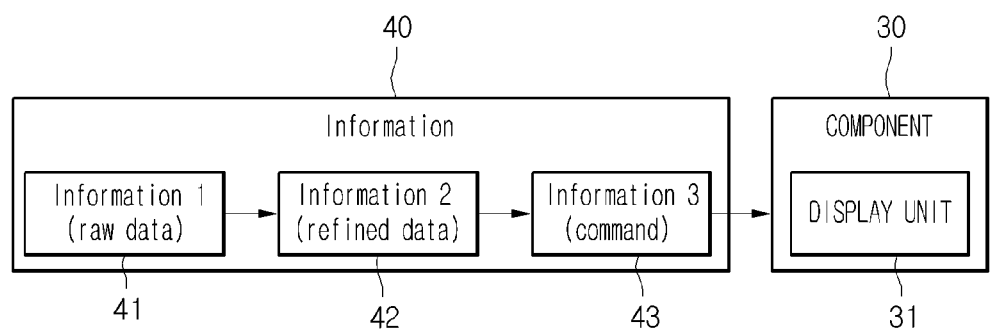
FIG. 3 is a block diagram showing an information transmission process on the network system according to the present disclosure.

FIG. 3 is a block diagram showing an information transmission process on the network system according to the present disclosure.

Referring to FIG. 3, in the network system according to the present disclosure, a specific component 30 may receive information related to energy (hereinafter, referred to as energy information 40) by means of a communication unit. The specific component 30 may further receive additional information (environment information, time information and the like) by means of the communication unit. In this instance, the information may be received from another component. That is, at least energy information is contained in the received information.

The specific component 30 may be a component that constitutes the UAN 10 or a component that constitutes the HAN 20.

As described above, the energy information 40 may be one of information related to electricity, water, gas and the like. Hereinafter, information related to electricity will be described as an example of the energy information, but information related to other energy sources may be identically applied.

For example, the kind of information related to the electricity may include time-based pricing, curtailment, grid emergency, grid reliability, energy increment, operation priority, and the like.

The information may be divided into scheduled information previously produced based on previous information, and real-time information changed in real time. The scheduled information and the real-time information may be divided by whether or not predict information after the current time (in the future).

The energy information 40 may be transmitted/received as a true or false signal such as a Boolean signal on the network system, or may be transmitted/received as a real price. Alternatively, the energy information 40 may be transmitted/received by being divided into a plurality of levels.

The energy information 40 may be divided into time of use (TOU) information, critical peak pattern (CPP) information or real time pattern (RTP) information according to the change in the pattern of data with respect to time.

According to the TOU information, a data is changed step by step depending on time. According to the CPP information, a data is changed step by step or in real time depending on time, and emphasis is displayed at a specific point of time. According to RTP information, a data is changed in real time depending on time.

In a case where the energy information is time-based pricing information as an example, the time-based pricing information is changed. The time-based pricing information may be transmitted/received as a true or false signal such as a Boolean signal on the network system, or may be transmitted/received as a real price. Alternatively, the time-based pricing information may be transmitted/received by being divided into a plurality of levels.

In a case where the specific component 30 receives a true or false signal such as a Boolean signal, one signal may be recognized as an on-peak signal, and the other signal may be recognized as an off-peak signal.

Alternatively, the specific component 30 may recognize information on at least one drive, which contains the time-based information, and may recognize an on-peak or off-peak signal by comparing the value of the recognized information with the value of reference information.

For example, in a case where the specific component 30 recognizes information divided into levels or real pricing information, it recognizes an on-peak or off-peak signals by comparing the value of the recognized information with the value of reference information.

In this case, the value of the information on drive may be at least one of time-based pricing, electric energy, the variation of time-based pricing, the variation of electric energy, the average of time-based pricing and the average of electric energy. The value of reference information may be at least one of an average, the average between maximum and minimum values of power information during a predetermined period of time and the reference variation of power information during the predetermined period of time (e.g., the slope of consumed electric energy per unit time).

The value of reference information may be determined in real time or may be previously determined. The value of reference information may be determined on the UAN or may be determined on the HAN (a customer's direct input or an input from the energy management component, the central management component or the like).

In a case where the specific component 30 (e.g., the energy consumption component) recognizes an on-peak signal (e.g., at a point of time of recognition), an output may be determined as zero (stop or maintenance of a stop state) or may be decreased. If necessary, the output may be restored or increased. The driving scheme of the specific component may be previously determined before the specific component is operated, or may be changed when the specific component recognizes an on-peak signal posterior to the start of operation.

Alternatively, in a case where the specific component 30 recognizes an on-peak signal (e.g., at a point of time of recognition), the output is maintained under an operable condition. In this case, the operable condition means that the value of the information on drive is less than a predetermined reference. The value of the information on drive may be time-based pricing, consumed electric energy, operation time, or the like. The predetermined reference may be a relative or absolute value.

The predetermined reference may be determined in real time or may be previously determined. The predetermined reference may be determined on the UAN or may be determined on the HAN (a customer's direct input or an input from the energy management component, the central management component or the like).

Alternatively, in a case where the specific component recognizes high-cost information, the output of the specific component may be maintained or increased when the difference between a state information value and a reference value is within a predetermined range. For example, in a case where a compressor of a refrigerator is not operated in a low-cost section, the temperature of a cool chamber or freezing chamber is increased. Therefore, the compressor is necessarily turned on when the temperature of the cool chamber or freezing chamber approaches a reference temperature. In a case where a high-cost section comes after the compressor is turned on, the compressor maintains a current output when the difference between the temperature of the cool chamber or freezing chamber and the reference temperature is within a predetermined range. In a case where a user selects a button for cancelling power saving in the state that the specific component 30 recognizes the high-cost information, the output of the specific component may be maintained.

Alternatively, in a case where the specific component 30 recognizes an on-peak signal (e.g., at a point of time of recognition), the output may be increased. However, although the output is increased at the point of time when the specific component recognizes the on-peak signal, the total output amount of the specific component during the entire drive period may be decreased or maintained as compared with that when the specific component is operated at a normal output level. Alternatively, although the output is increased at the point of time when the specific component recognizes the on-peak signal, the total consumed power or total time-based pricing of the specific component during the entire operation period may be decreased as compared that when the specific component is operated at a normal output level.

In a case where the specific component 30 recognizes an off-peak signal (e.g., at a point of time of recognition), the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output (change in the state of cool air that is a medium for performing the function of the refrigerator). In a case where the specific component is a washing machine or washer, hot water may be stored by driving a heater earlier than the time when the heater is to be operated (storage of hot water that is an additional medium for performing the function of the washing machine or washer). Alternatively, in a case where the specific component is a refrigerator, cool air may be stored in a separate supercooling chamber by increasing an output as compared with the existing output. Alternatively, in a case where the specific component recognizes an off-peak signal (e.g., at a point of time of recognition), electricity may be stored.

The curtailment information is information related to a mode in which the specific component is stopped or a small amount of time-based pricing is taken. As an example, the curtailment information may be transmitted/received as a true or false signal such as a Boolean signal on the network system.

If the specific component 30 recognizes curtailment information, the output may be determined as zero (stop or maintenance of a stop state) or may be decreased as described above.

The grid emergency information is information related to a power failure or the like. As an example, the grid emergency information may be transmitted/received as a true or false signal such as a Boolean signal on the network system. The information related to a power failure or the like has a relation with the reliability of a component using energy.

In a case where the specific component 30 recognizes grid emergency information, it may be immediately shut down.

The grid reliability information is information related to the supply amount of electricity supplied or information related to the quality of electricity. The grid reliability information may be transmitted/received as a true or false signal such as a Boolean signal on the network system, or may be determined by a component (e.g., an electric home appliance) through the frequency of AC power supplied to the component.

That is, if a frequency lower than the frequency of AC power supplied to the component is sensed, it may be determined that the amount of electricity supplied is small (information on the deficiency of the amount of electricity supplied). If a frequency higher than the frequency of AC power supplied to the component is sensed, it may be determined that the amount of electricity supplied is large (information on the excess of the amount of electricity supplied).

In a case where the specific component recognizes shortage of the amount of electricity or poor quality of electricity in the grid reliability information, an output may be determined as zero (stop or maintenance of a stop state) or may be decreased. If necessary, the output may be restored or increased.

On the other hand, in a case where the specific component recognizes the information on the excess of the amount of electricity supplied, the output may be increased, or the operation may be converted from an off-state to an on-state.

The energy increment information is information related to a state that surplus electricity is generated because the amount of electricity used by a component is less than that of power generation. As an example, the energy increment information may be transmitted/received as a true or false signal such as a Boolean signal on the network system.

In a case where the specific component 30 recognizes energy increment information, the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case where the specific component 30 is the energy storage component 13 or 23, the energy storage component 13 or 23 may store electricity by receiving the electricity supplied from the UAN, for example, when electricity storage cost is smaller than a predetermined value.

However, in a case where the energy storage component is connected to the energy generation component 21 that constitutes the HAN, it may continuously store energy generated by the energy generation component 21 until the electricity storage is completed. That is, the energy generated while the energy generation component 21 generates energy may be stored in the energy storage component 23.

The presence of completion of the electricity storage is determined while the energy storage component 13 or 23 stores electricity. In a case where the electricity storage is completed, the electricity supply for the electricity storage is cut off. Specifically, the presence of completion of the electricity storage may be determined using a sensor that senses the voltage, temperature or current of the energy storage component 13 or 23. The cutoff of the electricity supply may be performed using a switch (or circuit breaker) provided to a supply stage through which the electricity is supplied to the energy storage unit 13 or 23.

The electricity storage cost may be cost consumed in the electricity storage for a specific time period or electricity cost at a specific time.

As an example, in a case where the electricity storage cost is in an off-peak section (in a case where the specific component recognizes low-cost information which will be described later), the energy storage component 13 or 23 may store electricity. Alternatively, in a case where an on-peak section corresponds to an allowance section (in a case where the specific component recognizes high-cost information which will be described later), the energy storage component 13 or 23 may store in the on-peak section. In this instance, the allowance section is a section in which a power consumption information value is less than a predetermined reference. The power consumption information value may be a electricity cost, a power consumption amount, a time range, or the like. The predetermined reference may be a predetermined cost, a predetermined power consumption amount, a predetermined time, or the like. The predetermined reference may be a relative value or absolute value, and may be changed automatically or manually.

The energy storage component 13 or 23 may store a counter electromotive force generated when an energy consumption component that is rotatably operated or a motor provided to the energy consumption component is stopped (rotated).

Alternatively, the energy storage component 13 or 23 may store electricity using an energy consumption component that is rotatably operated or a motor provided to the energy consumption component. For example, in a case where the energy consumption component is a refrigerator, the energy storage component 13 or 23 may store electricity generated when a fan motor provided to the refrigerator is rotated (the fan motor may serve as a power generator or may be connected to the power generator). Alternatively, in a case where the energy consumption component is a washing machine, the energy storage component 13 or 23 may store electricity generated when a motor that rotates a drum for accommodating the laundry is rotated. In a case where the energy consumption component is a cooking appliance, the energy storage component 13 or 23 may store electricity generated when a motor for rotating a cooling fan is rotated. In a case where the energy consumption component is an air cleaner, the energy storage component 13 or 23 may store electricity generated when a motor for rotating a fan is rotated. That is, in this embodiment, in a case where a motor is provided regardless of the kind of the energy consumption component, the energy storage component 13 or 23 may store electricity generated when the motor is rotated. Alternatively, in a case where a power generator is connected to a fan rotated by the flow of air (natural flow or forcible flow), the energy storage component 13 or 23 may store electricity generaged by the power generator.

The electricity stored in the energy component 13 or 23 may be supplied to one or more energy consumption components 26. In a case where electricity cost is higher than a reference value, the electricity stored in the energy component 13 or 23 may be supplied to the energy consumption component 26. As an example, in a case where the electricity cost is an on-peak (in a case where the specific component recognizes the high-cost information), the electricity stored in the energy storage component 13 or 23 may be supplied to the energy consumption component 26. In a case where the electricity cost is an off-peak (in a case where the specific component recognizes the low-cost information) but is close to the on-peak, the electricity stored in the energy storage component 13 or 21 may be supplied to the energy consumption component. If the electricity stored in the energy storage component 13 or 23 is less than a predetermined value, electricity generated in the energy generation component 11 is supplied to the energy consumption component. Thus, it is possible to prevent the operation of the energy consumption component from being stopped due to the cutoff of the electricity supply while the energy consumption component is operated.

In a case where the supply of electricity generated in the energy generation component 11 is cut off by interruption of electric power, the electricity stored in the energy component 13 or 23 may be supplied to the energy consumption component. In a case where the energy consumption component is an electric product, the electricity stored in the energy storage component 13 or 23 may be supplied to a communication unit or control unit provided to the electric product.

The electricity stored in the energy component 13 or 23 may be supplied to a portion of a plurality of energy consumption components. As an example, the stored electricity may be supplied to an electric product such as a refrigerator required in continuous operation among a plurality of electric products. Alternatively, the stored electricity may be supplied to an energy consumption component with relatively low power among a plurality of energy consumption components that constitute one electric product. It will be apparent that the stored electricity is supplied to an energy consumption component with high power. Alternatively, when a course using a relatively small amount of power is performed among a plurality of courses in which an electric product is performed, the stored electricity may be supplied. It will be apparent that the stored electricity may be supplied even when a course using a large amount of power is performed.

Meanwhile, in a case where electricity is generated and stored by a fan or motor as described above, the electricity stored in the energy storage component 13 or 23 may be supplied to an energy consumption unit with relatively low power. As an example, the electricity stored in the energy storage component 13 or 23 may be supplied to an LED lamp, a display, a control unit, a communication unit, a low-power heater, or the like. Alternatively, in a case where the energy consumption component performs a plurality of courses, the electricity stored in the energy storage component 13 or 23 may be supplied to the energy consumption component in a course that requires low power.

The energy storage component 23 may be built in connected to one energy consumption component. Alternatively, a plurality of energy storage components 23 may be built in or connected to a plurality of energy consumption components, respectively. Alternatively, a plurality of energy storage components 23 may be built in or connected to one energy consumption component. The plurality of energy storage components 23 may be connected to one another to share the stored electricity.

Among the information related to energy, the on-peak information, the curtailment information and information on the deficiency of the amount of electricity supplied may be recognized as high-cost information considered that energy cost is relatively expensive. In this instance, the section in which the high-cost information is recognized by the specific component may referred to as a low-cost section.

On the other hand, among the information related to energy, the off-peak information, the energy increment information and the information on the excess of the amount of electricity supplied may be recognized as low-cost information considered that energy cost is relatively cheap. In this instance, the section in which the low-cost information is recognized by the specific component may be referred to as a low-cost section.

The information related to the fluctuation of the energy cost (high-cost or low-cost information) may be recognized as information for determining a power saving driving scheme of the specific component (e.g., the energy consumption component). That is, the information related to the fluctuation of the energy cost may be recognized by dividing a time slot (time period) based on energy cost or pricing period (pricing zone) for determining a driving scheme of the specific component into at least two or more.

A high period means a high price time period (period of high cost) or a high pricing period and a low period means a low price time period (period of low cost) and a low pricing period.

As an example, in a case where the information related to energy is recognized as a Boolean signal, the time slot (time period) based on energy cost or pricing period (pricing zone) for determining a driving scheme of the specific component may be divided into two. In a case where the information related to energy is divided into a plurality of levels or recognized as real-time information, the time period or pricing period may be divided into three or more.

Meanwhile, the information related to energy cost corresponding to at least time may be recognized as information for determining a power saving driving scheme of the specific component. That is, the information related to energy cost may be recognized by dividing a time slot (time period) or pricing zone (time period) into at least two or more. As described above, the divided time period or pricing period may be determined based on the kinds of the recognized information (the Bloolean signal, the plurality of levels and the real-time information).

In other words, the information related to fluctuation of energy cost may be recognized by dividing a determination factor for driving the specific component into two or more, and functions on time and energy cost may be included in the determination factor.

In a case where the information related to energy cost is divided into two levels or more, the driving scheme of the specific component may be determined according to the information divided into levels.

On the other hand, in a case where the recognized information related to energy cost is not divided based on a specific reference (e.g., real-time cost information), it is compared with predetermined information, and the driving scheme of the specific component may be determined based on the compared result.

Here, the predetermined information may be reference information (e.g. reference value) for dividing the information related to energy cost, and the compared result may be whether not the information related to energy cost is more or less than the reference value.

Specifically, each of the kinds of information related to energy may be divided into first information 41 that is raw information, second information 42 that is refined information, and third information 43 that is information for performing the function of the specific component. That is, the first information is a raw data, the second information is a refined data, and the third information is a command for performing the function of the specific component.

The information related to energy is included a signal, and the signal is transmitted. In this instance, one or more of the first to third information may be transmitted several times while the content of the information is not converted but only the signal including the information is converted.

For example, as shown in FIG. 3, a component that receives a signal including the first information may convert only the signal and transmit a new signal including the first information to another component.

Therefore, it is described in this embodiment that the conversion of signal is a different concept from the conversion of information. In this instance, it can be readily understood that when the first information is converted into the second information, the signal including the first information is also converted into the signal including the second information.

However, the third information may be transmitted several times in the state that the content of the third information is converted or in the state that only the signal including the third information is converted while the content of the third information is identically maintained.

Specifically, in a case where the first information is raw information on time-based pricing, the second information may be refined information on the time-based pricing. The refined information on the time-based pricing is information in which the time-based pricing is divided into a plurality of levels or analysis information. The third information is a command generated based on the second information.

The specific component may generate, transmit or receive one or more of the first to third information. The first to third information are not necessarily transmitted or received in sequence. Only a plurality of pieces of third information without the first and second information may be transmitted in sequence or parallel. Alternatively, the first and third information may be transmitted or received together, the second and third information may be transmitted or received together, or the first and second information may be transmitted or received together.

As an example, in a case where the specific component receives the first information, it may transmit the second information or may transmit the second and third information.

In a case where the specific information receives only the third information, it may generate and transmit new third information.

Meanwhile, in the relation between two pieces of information, one is a message and the other is a response for the message. Thus, each of the components that constitute the network system may transmit or receive a message. In a case where each of the components receives a message, it may respond to the message. Therefore, in the case of an individual component, the transmission of a message is a relative concept with the response for the message.

The message may include a data (first or second information) and/or a command (third information).

The command (third information) may include a command for storing the data, a command for generating the data, a command for processing the data (including the generation of an additional data), a command for generating an additional command, a command for transmitting the additionally generated command, a command for transmitting a received command, and the like.

In this specification, the response for the received message means storage of the data, processing of the data (including generation of an additional data), generation of a new command, transmission of the newly generated command, simple transmission of a received command (including generation of a command for transmitting the received command to another component), operation, transmission of the stored information, transmission of an acknowledge message (acknowledge character or negative acknowledge character), or the like.

For example, in a case where the message is first information, the specific component that receives the first information may generate second information by processing the first information, or may generate the second information and new third information, as a response for the message.

The specific component that receives the message may provide a response related to energy. Here, the term "response" may be understood as a concept including an operation through which the specific component can perform a function. As an example, the HAN 20 may perform an operation related to energy by receiving a message.

The response (operation) related to energy, provided by the specific component, will be described in detail. For example, the specific component may be an energy consumption component.

The energy consumption component may be driven so that the energy cost when it is driven based on the recognition for energy information is reduced as compared with that when it is driven without the recognition for energy information.

The specific component may include a plurality of modes in which it is driven to perform its own function. The plurality of modes are a first mode and a second mode in which energy cost is relatively saved as compared with that in the first mode. The specific component may be driven in at least one of the first and second modes.

Here, the first mode may be a general mode and the second mode may be a power saving mode. Alternatively, the first and second modes may all be power saving modes.

The general mode may be understood as a mode in which the function of the specific component is performed without recognition of energy information. On the other hand, the power saving mode may be understood as a mode in which the function of the specific component is performed based on the recognition of energy information so as to save energy cost.

In a case where the first and second modes are power saving modes, the first mode may be specified as a driving scheme for saving energy cost and the second mode may be specified as a driving scheme in which the energy cost in the second mode is more saved than that in the first mode.

Meanwhile, in a case where the specific component (e.g., the energy consumption component) is driven, at least a portion is recognized in a driving scheme including at least drive time and course. In this case, an unrecognized portion may be generated so as to save energy cost, and a recognized portion may be converted into another scheme.

For example, at least a portion of the driving scheme may be recognized under the control of the energy management component, the control of the energy consumption component, or the like. In a case where a specific driving scheme is further required so as to save energy cost, an unrecognized portion of the driving scheme may be newly generated, and a recognized portion may be converted into another scheme so as to save energy.

It will be apparent that the process of generating the unrecognized portion may be omitted. In this case, the process of converting the recognized portion into another scheme. On the other hand, the process of converting the recognized portion into another scheme may be omitted. In this case, the process of newly generating the unrecognized portion may be performed.

The drive time may include a drive start time or drive end time. The course may include a drive period of the specific component and the power of the specific component.

The generated scheme or converted scheme may be a scheme recommended by the specific component so as to save energy cost. Here, the specific component may be an energy consumption component (control component) or the energy management component.

As an example, in a case where the recognized scheme is a specific drive time, the specific drive time may be converted into another time so as to save energy cost, and a specific course may be generated.

On the other hand, in a case where the recognized scheme is a specific course, the specific course may be converted into another course so as to save energy cost, and a specific time may be generated.

Under the control described above, a change in time or power may be made with respect to the output function of the specific component based on time.

The generated scheme or converted scheme may be performed within a set range. That is, in the process of recognizing at least a portion of the driving scheme, the generation or conversion of the driving scheme may be performed within a predetermined reference in which the recognized portion appears (e.g., restriction set by a user, constraint set under the control of the energy management component or energy consumption component, or the like).

Therefore, in a case where the set range is out of the predetermined reference, it is restricted to generate the unrecognized portion or to convert the recognized portion into another scheme.

Another embodiment is proposed.

Cost information may further included in the recognized driving scheme. That is, in a case where the cost information is recognized, a portion related to the drive time or course may be generated. The generated driving scheme may be recommended.

Meanwhile, a response of the specific component based on the information related to the fluctuation of the energy cost (high-cost or low-cost information), e.g., a power control for power saving driving, may be performed. An output decrease (including an output of zero) or output increase may be included in the output control.

It is as described above that the output is decreased or zero, maintained or increased based on the recognition for the information (on-peak or off-peak) related to energy cost.

If high-cost information is recognized, the output may be zero or decreased. Specifically, the output in the recognition of the high-cost information may be decreased as compared with that in the recognition of low-cost information. As described above, the decrease of the output may be previously determined before the specific component is operated, or may be changed when the high-cost information is recognized posterior to the start of the operation of the specific component.

In a case where the output of the specific component is zero or decreased, the function to be performed by the specific component may be lost as compared with a normal case. Therefore, a response for restoring the lost function may be performed.

As an example, after the output of the specific component is decreased, the specific component may be controlled so that the total operation time of the specific component is increased or so that the output is increased in at least a time period.

In other words, if specific reference information related to energy information is recognized in a period after the output of the specific component is controlled, the response for controlling the output may be released. Here, the term "period" may be divided based on a point of time when the high-cost information is recognized.

The total operation time may be understood as a time approaching a specific target in the process of performing the function of the specific component. As an example, in a case where the specific component is an electric appliance (washing machine, drying machine, cooking appliance or the like) intermittently driven (or driven in a specific course), the total operation time may be understood as a time until a corresponding course is completed.

On the other hand, in a case where the specific component is an electric appliance (refrigerator, water purifier, or the like) driven at normal times, the total operation time may be understood as a time approaching a target set for performing the function of the specific component. For example, the set target may be a target temperature, a target amount of ice produced, or a target amount of clean water in the refrigerator.

The total operation time may be increased as compared with the operation time set before the output of the specific component is decreased. In a case where the output of the specific component is not decreased, the total operation time may be increased as compared with the operation time of the specific component. However, although the total operation time of the specific component is increased, the specific component is controlled so that the total energy cost generated through the drive of the specific component can be saved as compared with that when the output of the specific component is not decreased.

If the high-cost information is recognized, the output of the specific component may be increased.

However, although the output is increased at a point of time when the high-cost information is recognized, the total output of the specific component during the entire driving period may be decreased or maintained as compared with that when the specific component is operated under a normal output. Alternatively, although the output is increased at a point of time when the high-cost information is recognized, the total power consumption or total time-based pricing of the specific component during the entire driving period may be decreased as compared with that when the specific component is operated under the normal output.

If the low-cost information is recognized, the output of the specific component may be increased. For example, in a case where the operation reservation of the specific component is set up, the driving of the specific component may be started before the setup time, or a component having a large output in a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case of a specific condition (additional condition) is generated based on the information related to the fluctuation of the energy cost (high-cost or low-cost information), the response of the specific component, e.g., the output control for power saving driving, may be limited. That is, the output of the specific component may be maintained.

Here, the term "limitation" may be understood as the release of the output control performed or not performed.

The specific condition includes a case where influence on energy cost is minute even though the output control of the specific component is not performed or a case where it is necessary to prevent a function to be performed by the specific component from being degraded when the output of the specific component is controlled.

Whether or not the influence on the energy cost is minute may be determined based on a predetermined reference (time-based pricing, power consumption or information on operation time). The predetermined reference may be a relative or absolute value.

The case where the function to be performed by the specific component is degraded may be considered as a case where the specific component is a defrosting heater, for example.

In a case where it is controlled to decrease the output in a high-cost time period and to increase the output in the low-cost time period, the driving of the defrosting heater is more frequently performed than that during a normal time (setup period). In this case, the temperature of a storage room in the refrigerator is increased, and thus, the control of the output can be limited.

Meanwhile, the specific component 30 may include a display unit 31 for displaying information. In this embodiment, the term "information display" means that visual, auditory, olfactory and tactile information is known to the outside. The display unit 31 may include a touch screen for selecting or inputting information. Alternatively, the specific component 30 may include a separate input unit for inputting information by cable or radio.

All the information (energy information or additional information except the energy information) described above may be displayed in the display unit 31. One of the energy information and additional information may be displayed, or two or more pieces of information may be simultaneously displayed. That is, two or more pieces of information may be simultaneously displayed in the display unit 31. As an example, in a case where two or more pieces of information are simultaneously displayed, any one of the information is selected. Then, the selected screen may be enlarged, and the unselected screen may reduced. As another example, if any one of the two or more pieces of information is selected, the selected screen may be enlarged, and the unselected screen may disappear. In a case where specific information is selected and the selected screen is enlarged, information more specific that the previous information or information different from the previous information may be displayed on the enlarged screen. For example, in a case where the selected information is a character, graphic information may be displayed on the enlarged screen, or two or more pieces of information may be sequentially displayed on the enlarged screen. In a case where two or more pieces of information are displayed in the display unit 31, two or more relative positions may be varied.

Information except energy cost information and energy cost may be displayed in the display unit 31. The energy cost information may include current cost, past cost or estimated cost in the future. The energy cost information may include not only information on cost information in a specific period or time but also information on cost used with respect to the operation of a component, cost used in the present, cost to be used (estimation cost), or the like.

The information except the energy cost information may include information on energy reduction, emergency situation, grid safety, power generation quantity, operation priority, energy consumption, energy supply amount, information (e.g., cost change rate, average cost, level or the like) newly generated based on two or more pieces of information (one or more pieces of energy cost information and/or information except the one or more pieces of energy cost information), and the like. In this instance, the energy consumption may be energy consumption used two or more HANs, and may be simultaneously or selectively displayed.

The information on energy consumption may include information on past consumption, current consumption and estimated consumption in the future. The information on energy consumption may include information on accumulated consumption for a specific period (time), average consumption, increasing rate of consumption, decreasing rate of consumption, maximum consumption, minimum consumption, and the like.

The additional information may include one or more of environment information, time information, information related to the one or more components, information related to another component and information related to a user using the one or more components. The environment information may include one or more of information related to carbon dioxide emission rate, concentration of carbon dioxide in air, temperature, humidity, precipitation, presence of rainfall, amount of solar radiation, amount of wind.

In addition to the information described above, information refined based on at least one information or newly generated information may also be displayed in the display unit 31.

In a case where the specific component 30 is the energy storage component 13 or 23, the presence of use of the stored electricity, the remaining amount of the store electricity and the like may be displayed. If the remaining amount of the stored electricity is less than a predetermined value, alarm information may be displayed.

The information displayed in the display unit 31 may include one or more of information on number, character, sentence, figure, shape, symbol, image and light. The information displayed in the display unit 31 may include one or more of information on graph for each time or period, level, table. One or more of the shape, color, brightness, size, position, alarm period, alarm time of the information displayed in the display unit 31 may be varied.

A currently operable function (or menu) may be displayed in the display unit 31. Alternatively, among a plurality of functions, operable and inoperable function may be divided by size, color, position and the like, and then displayed in the display unit 31. Alternatively, in a case where separate input units are provided, only an input units for selecting an operable function may be activated, or an input unit for selecting an operable function and an input unit for selecting an inoperable function may be displayed in different colors.

The target or display method of information displayed in the display unit 31 may be set and changed by a user, or may be changed automatically.

In a case where a condition for informing the user of information is satisfied, specific information may be displayed in the display unit 31. It will be apparent that a portion of a plurality pieces of information may be continuously displayed in the state that a component is turned on. The display time of the information may be changed or set automatically or manually.

If specific information (one or more pieces of information) is selected using the input unit, the selected information may be displayed. If a user contacts a portion of a component, e.g., an input unit, a handle, a display or the like, regardless of information display selection, or operates one or more buttons or knobs that constitute the input unit, a portion of the information may be displayed. In this instance, the information to be displayed may be set or changed. It will be apparent that a sensing unit for sensing a user's contact may be provided to the component. Alternatively, the specific information may be displayed by installation environment or variation of outdoor environment. Alternatively, the specific information may be displayed when the specific component receives new information. Alternatively, the specific information may be displayed when the kind or state of the specific component is changed. As an example, if a light emitting unit is turned off in an off-peak section and an on-peak section comes, the light emitting unit may be turned on. Alternatively, the specific information may be automatically displayed when the operation or state of the component is changed. As an example, in a case where the mode of the component is changed, information related to the changed mode may be automatically displayed.

Meanwhile, the display unit 31 may be separably connected or fixed to the component 30. In a case where the display unit 31 is separable from the component 30, it may perform wired or wireless communication with the component 30 (or control unit of the component). In a case where the display unit 31 is fixed to the component 30, it may also perform wired or wireless communication with the component 30.

In a case where the display unit 31 is separable from the component 30, a communication unit and an input unit for inputting or selecting information may be provided to the display unit 31. Thus, information can be inputted or selected through the input unit in the state that the display unit 31 is separated from the component 30. The communication unit may be provided to the component 30, and only the display unit 31 may be separated from the component 30. The display unit 31 may be the energy management component 24, the energy metering component 25 or the central management component 27, or may be a separate control apparatus.

In a case where the display unit 31 is provided with a communication unit, a communication unit may also provided to the component 30. In a case where the display unit 31 and the component 30 are in the state that they are communicated with each other and information is transmitted/receive through a communication signal, the display unit 31 may be used. That is, in a case where the intensity of a signal is secured so that information can be included in the communication signal, the display unit 31 may be in an available state. On the other hand, in a case where the display unit 31 is not communicated with the component 30 or information is not included in the communication signal due to the weak intensity of the signal, the display unit may be in an unavailable state. One of the display unit 31 and the component 30 transmits a communication signal, and the other of the display unit 31 and the component 30 transmits a response signal. The presence of use of the display unit 31 may be determined by the presence of reception of the communication and response signals and the signal intensity. That is, in a case where any one of the display unit 31 and the component 30 does not receive a signal or the intensity of received signal is less than a reference intensity, it may be determined that the display unit 31 is unavailable. Any one of the display unit 31 and the component 30 may increase the intensity of a transmission signal until it receives a response signal of which intensity is more than the reference intensity.

Information for informing the user of the presence of use of the display unit 31 may be displayed in the display unit 31 or the component 30. If it is recognized that the display unit 31 is unavailable, the component 30 may be controlled to increase its unique performance, to perform a door locking function or to limit its operation. Alternatively, the power of the component may be off while maintaining the power of a communication apparatus (modem) required to perform communication in the network system. Alternatively, the power of the component may be off while maintaining only a memory function for storing the state information of the component.

Meanwhile, sensors may be provided to the respective display unit 31 and component 30 so as to sense the presence of mounting of the display unit 31. As an example, the presence of mounting of the display unit 31 may be determined when the component 30 is operated. Each of the sensors may be a vibration sensor for sensing vibration. If the display unit 31 is mounted on the component 30, vibration generated in the operation of the component 30 can be transferred to the display unit 31. Therefore, in a case where the difference between the values of vibrations respectively sensed by the sensors is less than a predetermined value, it may be recognized that the display unit 31 is mounted on the component 30. If it is recognized that the display unit 31 is mounted on the component 30, the operation of the component 30 may be controlled so that vibration or noise generated in the operation of the component 30 is decreased. As an example, in a case where the component 30 is a washing machine or drier, the rotation speed of a motor may be decreased. In a case where the component 30 is a refrigerator, the driving period of a compressor may be decreased. On the contrary, if it is recognized that the display unit 31 is separated from the component 30, the component may be controlled to increase its unique performance, to perform a door locking function or to limit its operation.

As another example, each of the sensor may be a temperature sensor. In a case where the difference between the values of temperatures respectively sensed by the sensors is less than a predetermined value, it may be recognized that the display unit 31 is mounted on the component 30.

In the state that the display unit 31 is separated from the component 30, an auxiliary display unit may be provided to the component 30 so as to enable the operation of the component 30. The presence of operation of the auxiliary display unit may be determined based on the presence of use of the display unit 31. As an example, if the display unit 31 is separated from the component 30 or is unavailable, the auxiliary display unit may be turned on.

Figure 4:
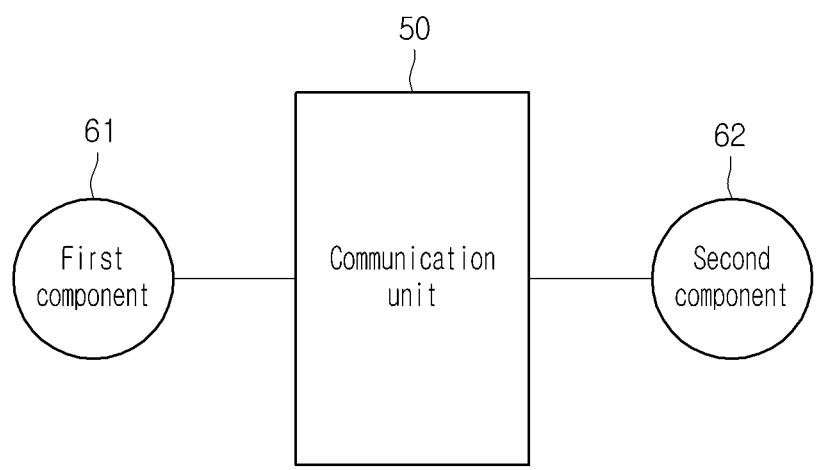
FIG. 4 is a view showing the communication structure of two components that constitute the network system according to a first embodiment.
Figure 5:
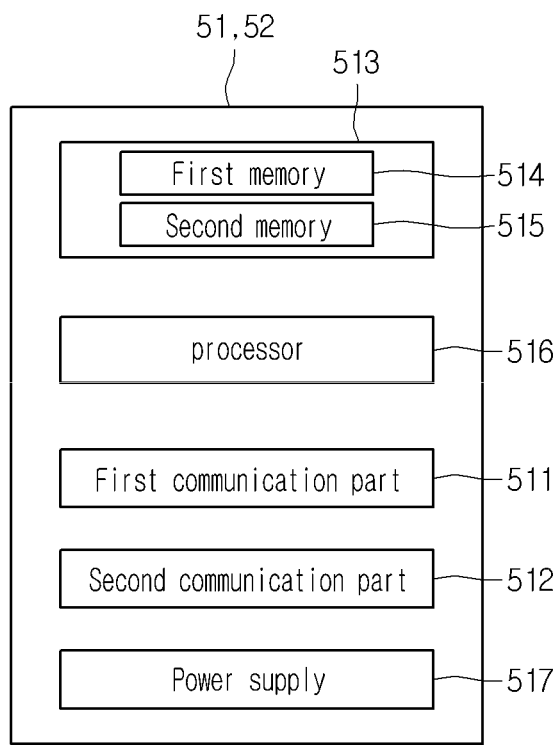
FIG. 5 is a block diagram showing the detailed configuration of a communication device that constitutes a communication unit.

FIG. 4 is a view showing the communication structure of two components that constitute the network system according to a first embodiment. FIG. 5 is a block diagram showing the detailed configuration of a communication device that constitutes a communication unit.

Referring to FIGS. 2, 4 and 5, first and second component 61 and 62 that constitute the network system may perform wired or wireless communication by means of a communication unit 50. The first and second components 61 and 62 may perform unidirectional or bidirectional communication.

In a case where the two components 61 and 62 perform wired communication, the communication unit 50 may be a simple communication line or power line communication means. It will be apparent that the power line communication means may include communicators (e.g., a modem or the like) respectively connected to the two components.

In a case where the two components 61 and 62 perform wireless communication, the communication unit 50 may include a first communicator 51 connected to the first component 61 and a second communicator 52 connected to the second component 62. In this case, the first and second communicators 51 and 52 perform wireless communication with each other.

As an example, if any one of the first and second communicators is powered on, one of the two communicators may transmit a network participation request signal, and the other of the two communicators may transmit a permission signal. As another example, if any one of the first and second communicators is powered on, the powered-on communicator may transmit a network participation request signal to a communicator previously participated in the network, and the communicator that receives the request signal may transmit a permission signal to the powered-on communicator.

In a case where a communicator that recognizes energy information determines that an error occurs in the received information in the state that a specific component participates in the network, the information is re-requested. For example, in a case where the first communicator receives energy information from the second communicator but an error occurs in the received information, the first communicator may request the second communicator to re-transmit the energy information. If the first communicator does not receive normal information for a predetermined time or number of times, it is determined that the first communicator has an error. In this case, information for informing a user of the error may be displayed in the first communicator or the first component 61.

The first component 61 may be a component that constitutes the UAN 10 or a component that constitutes the HAN 20.

The second component 62 may be a component that constitutes the UAN 10 or a component that constitutes the HAN 20.

The first and second components 61 and 62 may be the same kind of component or different kinds of components.

Components may be joined in the UAN 10 or the HAN 20.

Specifically, addresses may be assigned to a plurality of components, e.g., first and second components, respectively. Here, the addresses are necessary for performing communication between the components and can be mapped to at least a group.

The address may be understood as values respectively converted from the unique code of the first or second component. That is, at least a portion of the components that constitute the network system may have an unchangeable/unique code, and the code may be converted into an address for building a network.

In other words, product codes for at least some of the plurality of components capable of constituting first and second networks may be converted into different network codes based on the constituted networks.

As an example, the product code may be a unique code determined in production of electric appliances or a code separately provided for the registration of a network. The product code may be converted into an identity (ID) for identifying a network to which the electric appliance is to be registered.

The first and second networks may be networks that constitute the UAN 10 or networks that constitute the HAN 20. On the other hand, the first and second networks may be the UAN 10 and the HAN 20, respectively. Alternatively, the first and second networks may be the HAN 20 and the UAN 10, respectively.

A first component and a second component for allowing the first component to participate in the network may be included in the plurality of components that constitute the network. For example, the first component may be an electric appliance and the second component may be a server.

Any one of the first and second components transmits a request signal for participating in the network, and the other of the first and second components may transmit a permission signal.

That is, a signal may be transmitted/received between the first and second components, and whether or not to participate in the network may be determined based on the transmission time or number of the signal.

As an example, the first component transmits a test signal to the second component, and it is determined whether or not a response signal from the second component is transmitted to the first component. In a case where the response signal is not transmitted, the first component re-transmits the test signal, and it is re-determined whether or not a response signal from the second component is transmitted to the first component. By repeating such a process, if the transmission number of the test signal exceeds the setting number of the test signal, it may be determined that the second component does not participate in the network.

Meanwhile, the first component may transmit the test signal to the second component. If a response signal from the second component is not transmitted within a setup time, it may be determined that the second component does not participate in the network.

The first and second communicators 51 and 52 may have the same structure. Hereinafter, the first and second communicators 51 and 52 will be referred to as a communicator 51 and 52.

The communicator 51 and 52 may include a first communication part 511 for communication with the first component 61, a second communication part 512 for communication with the second component 62, a memory 513 for storing information received from the first component 61 and information received from the second component 62, a processor 516 for performing information processing, and a power supply 517 for supplying power to the communicator 51 and 52.

Specifically, the communication language (or scheme) of the first communication part 511 may be identical to or different from that of the second communication part 512.

Two kinds of information respectively received from the two components may be stored in the memory 513. The two kinds of information may be stored in a single sector or may be respectively stored in sectors. In any case, an area in which the information received from the first component 61 may be referred to as a first memory 514, and an area in which the information received from the second component 62 may be referred to as a second memory 515.

The processor 516 may generate first information or generate second and third information based on information received from the component or another communicator.

As an example, in a case where the communicator 51 and receives the first information, it may generate information or sequentially generate the information and the second information by processing a data. Alternatively, in a case where the communicator 51 and 52 receives the first information, it may generate the second and third information by processing a data. In a case where the communicator 51 and 52 receives the third information, it may new third information.

For example, in a case where the second component is an energy consumption component (electric home appliance, component that constitutes the electric home appliance, or the like), the second communicator may generate a command for reducing energy consumption. In a case where the second component is an energy generation component, energy distribution component or energy storage component, the second communicator 52 may generate a command for energy generation time, generation amount, energy distribution time, distribution amount, energy storage time, storage amount or the like. In this case, the second communicator 52 serves as an energy management component.

The power supply 517 may receive electricity supplied from the components 61 and 62 or may receive electricity supplied from a separate power source. Alternatively, the power supply 517 may be a battery or the like.

Figure 6:
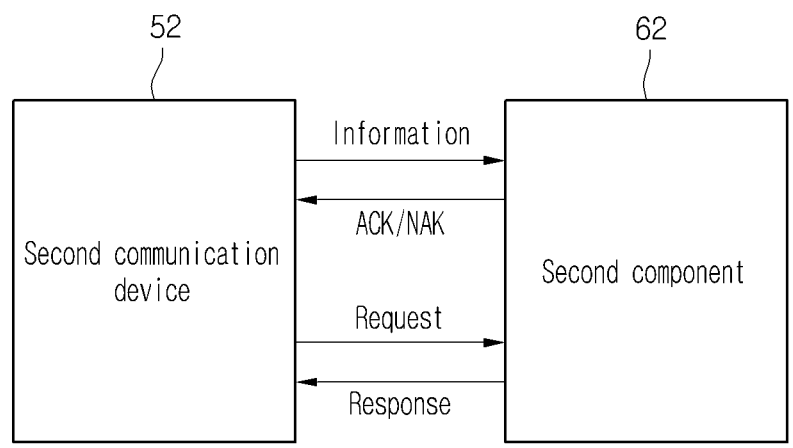
FIG. 6 is a view showing a communication performing process between a specific component and a communication device according to the first embodiment.

FIG. 6 is a view showing a communication performing process between a specific component and a communication device according to the first embodiment.

Hereinafter, for convenience of illustration, a communication performing process between the second component and the second communicator 52 will be described as an example. A communication performing process between the first component 61 and the first communicator 51 may be identically applied to that between the second component 62 and the second communicator 62.

Referring to FIGS. 5 and 6, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

The information received from the first communicator 51 is stored in the memory 513. The second communicator 52 transmits a message to the second component 62 as a response for the message. In this instance, the message transmitted to the second component 62 relates to new information different from the information previously stored in the memory 513, or information generated in the processor 516.

Then, the second component 62 transmits an acknowledge character (ack) or negative acknowledge character (Nak) to the second communicator 52 as a response for the message. The second component 62 performs a function (generation of a command, operation, or the like) based on the received information, or waits for performing the function.

Meanwhile, the second communicator 52 requests component information to the second component 62 in real time or by periods. As an example, the component information may be component state information or information on a component unique code, a manufacturer, a service name code, an electricity use amount, and the like. Then, the second component 62 transmits component information to the second communicator 52 as a response for the request. The component information is stored in the memory 513 of the second communicator 52.

If the second communicator 52 receives a message for requesting the component information from the first communicator 51, it transmits the component information stored in the memory 513 to the first communicator 51 as a response for the message. Alternatively, the second communicator 52 transmits the component information stored in the memory 513 to the first communicator 51 in real time or by periods.

The second communicator 52 may transmit the information of the first component, stored in the memory, to the first component together with the information received from the first component. Alternatively, the second communicator 52 may transmit the information of the first component, stored in the memory, to the first component, separately from transmitting the information received from the first component.

The second communicator 52 stores the information of the second component 62 in the memory 513. Hence, in a case where the second communicator 52 receives a message for requesting the component information from the first communicator 51, it transmits the component information stored in the memory 513 directly to the first communicator 51 without a request for information to the second component 62, and thus, the communication load of the second component 62 can be reduced. That is, the second component becomes a virtual component.

Figure 7:
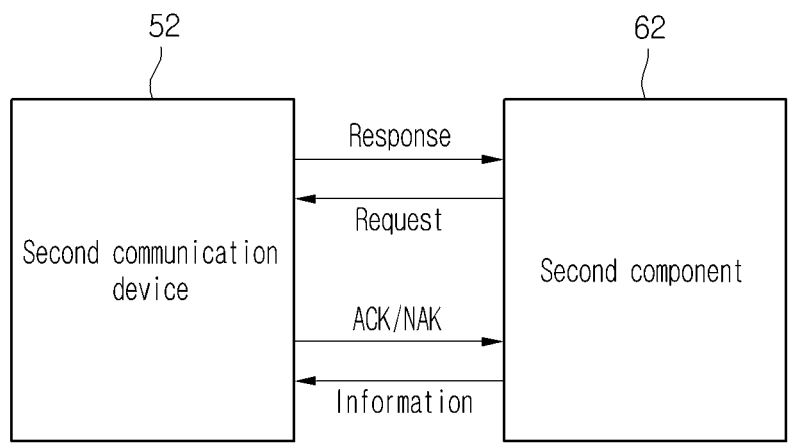
FIG. 7 is a view showing a communication performing process between a specific component and a communication device according to a second embodiment.

FIG. 7 is a view showing a communication performing process between a specific component and a communication device according to a second embodiment.

Hereinafter, for convenience of illustration, a communication performing process between the second component and the second communicator 52 will be described as an example. A communication performing process between the first component 61 and the first communicator 51 may be identically applied to that between the second component 62 and the second communicator 62.

Referring to FIGS. 5 and 7, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

If the second communicator 52 receives a message for requesting information from the second component 62, it transmits a message to the second component 62 as a response for the message for requesting the information. In this instance, the message transmitted to the second component 62 relates to new information different from the information previously stored in the memory 513, or information generated in the processor 516. Alternatively, the information transmitted to the second component 62 may be information received from the first component.

The second component 62 performs a function based on the received information or waits for performing the function.

Meanwhile, the second component 62 transmits component information to the second component 62 in real time or by periods. As an example, the component information may be component state information or information on a component unique code, a manufacturer, a service name code, an electricity use amount, and the like.

As described above, the electric use amount may be detected by the smart meter. In a case where the electricity use amount is included in the information of the second component 62, the correction of an actual electricity use amount may be performed by comparing the information of the second component 62 with the information of the smart meter.

Then, the second communicator 52 stores the information of the second component 62 in the memory 513, and transmits an acknowledge character (ack) or negative acknowledge character (Nak) to the second component 62 as a response for the message.

If the second communicator 52 receives a message for requesting component information from the first communicator 51, it transmits the information of the second component 62, stored in the memory 513, to the first communicator 51 as a response for the message. Alternatively, the second communicator 52 the information of the second component 62, stored in the memory 513, to the first communicator 51 in real time or by periods.

The second communicator 52 stores the information of the second component 62 in the memory 513. Hence, in a case where the second communicator 52 receives the message for requesting the component information from the first communicator 51, it transmits the information stored in the memory 513 directly to the first communicator 51 without transmitting a request for information to the second component 62, and thus, the communication load of the second component 62 can be reduced. That is, the second communicator 52 becomes a virtual component.

<Applications>

In the following descriptions, the first and second components may be reversed to each other, and therefore, overlapping descriptions will be omitted. For example, in a case where the first component is an electric home appliance and the second component is an energy management component, description in a case where the first component is an energy management component and the second component is an electric home appliance will be omitted.

Information transmitted/received by each of the components may be all the information described above. Particularly, specific information may be transmitted/received for each of the components.

The energy generation components 11 and 21 may transmit/receive information related to energy generation amount, and the like. The energy distribution components 12 and 22 may transmit/receive information related to energy distribution amount, distribution time, and the like. The energy storage components 13 and 23 may transmit/receive information related to energy storage amount, storage time, and the like. The energy metering components 15 and 25 may transmit/receive information related to energy consumption amount, and the like. The energy management components 14 and 24 may transmit/receive information related to energy generation, distribution, storage, consumption, cost, reliability, emergency situation, and the like.

(1) Case where Second Component is One Component of HAN

The second component 62 may be an energy consumption component 26, e.g., a heater, motor, compressor, display or the like. In this case, the first component 61 may be a MICOM or energy consumption component 26 as an example. The MICOM or energy consumption component 26 may transmit a message for reducing energy consumption to another energy consumption component 26. Then, the another energy consumption component 26 may perform an operation for reducing energy, for example.

As another example, the energy consumption component 26 may be an electric home appliance. In this case, the first component 61 may be an energy storage component 23, an energy consumption component 26 (electric home appliance), an energy management component 24, an energy metering component 25, a central management component 27, a web server component 28, or a component that constitutes the UAN 10.

In this instance, an energy management function may be included or not included in the first component 61 except the energy management component 24.

In a case where an energy management function or solution is not included in the first component 61, it may be included in the communication unit or may be included in the MICOM of the second component 62. In this case, the energy management function is related to the consumption of energy.

As still another example, the second component 62 may be an energy generation component 21, an energy distribution component 22 or an energy storage component 23. In this case, the first component 61 may be an energy management component 24, a central management component 27, a web server component 28 or a component that constitutes the UAN 10.

A message may be transmitted to the second component 62. Here, the message may include energy generation time, generation amount or the like, energy distribution time, distribution amount or the like, and energy storage time, storage amount or the like.

In this instance, an energy management function may be included or not included in the first component 61 except the energy management component 24.

In a case where an energy management function or solution is not included in the first component 61, it may be included in the communication unit. In this case, the energy management function is related to the generation, distribution and storage of energy.

As still another example, the second component may be an energy metering component 25. In this case, the first component 61 may be a central management component 27, a web server component 28 or a component that constitutes the UAN 10.

An energy management function may be included or not included in the energy metering component. In a case where the energy management function is included in the energy metering component 25, the energy metering component 25 performs the same operation as the EMS.

In a case where an energy management function or solution is included in the energy metering component 25, it may be included in the communication unit or may be included in the second component 62.

As still another example, the second component 62 may be a central management component 27. In this case, the first component 61 may be a web server component 28 or a component that constitutes the UAN 10.

(2) Case where Second Component is One Component of UAN

The first component 61 may be a component that constitutes the UAN 10. In this case, the first and second components 61 and 62 may be the same kind of component or different kinds of components.

An energy management function may be included in the first component 61, the second component 62 or the communication unit.

The energy management function included in a specific component or the energy management function included in the energy management component 14 may be related to generation amount, distribution amount, storage amount, energy use amount of a component that constitutes the HAN 20.

In this specification, an example capable of constituting the network system has been described. However, any component not mentioned in this specification may be a first or second component that performs communication through the communication unit. For example, an automobile may be a second component, and the energy management component 24 may be a first component.

(3) Case where One of First and Second Components Communicates with Third Component Although the communication between two components has been described in the aforementioned examples, each of the first and second components may perform communication with one or more components (a third component to an n-th component).

In this case, the relation of the first or second component that performs communication with the third component and the like may be one of the aforementioned examples.

For example, the first component may be a component that constitutes the UAN, the second component may be an energy management component 24 that communicates with the first component, and the third component may be an energy consumption component 26 that communicates with the second component. In this instance, one or more of the three components may communicate with another component.

In this specification, the first to n-th components may be components that constitute the UAN or components that constitute the HAN. Alternatively, a portion of the components may be components that constitute the UAN, or another portion of the components may be components that constitute the HAN.

Hereinafter, third and fourth embodiments will be described. A difference between these embodiments and the aforementioned embodiments will be mainly described, and descriptions and reference numerals will be quoted to elements of these embodiments identical to those of the aforementioned embodiments.

Figure 8:
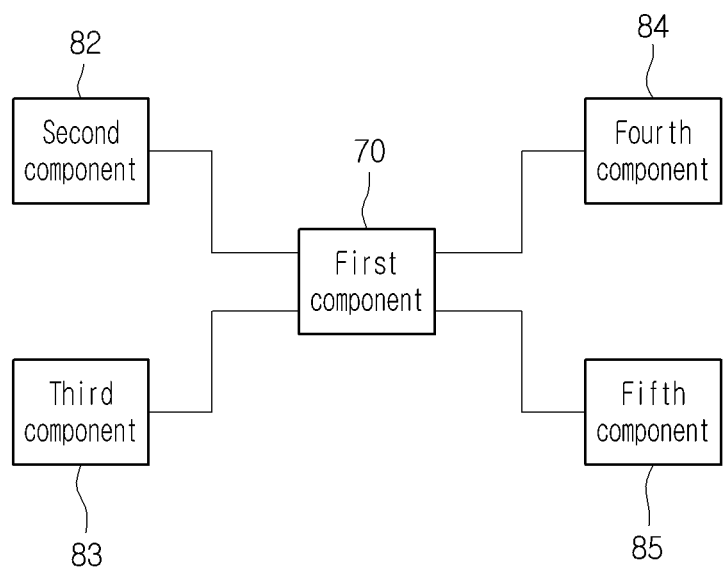
FIG. 8 is a view showing the communication structure of components that constitute the network system according to a third embodiment.
Figure 9:
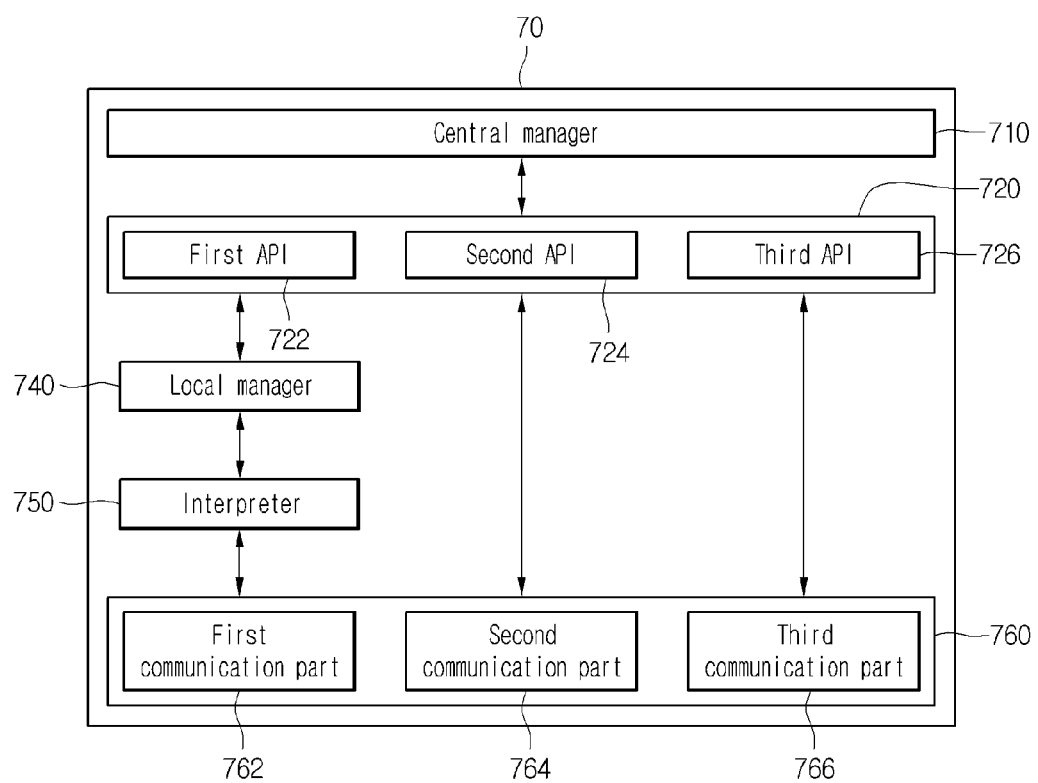
FIG. 9 is a block diagram showing the detailed configuration of a first component in FIG. 8.

FIG. 8 is a view showing the communication structure of components that constitute the network system according to a third embodiment. FIG. 9 is a block diagram showing the detailed configuration of a first component in FIG. 8.

Referring to FIGS. 8 and 9, a first component 70 may communicate with second to fifth components 82, 83, 84 and 85. Hereinafter, it will be described as an example that the first component 70 is a central management component (home server), the second and third components 82 and 83 are energy consumption components (electric home appliances), the fourth component 84 is an energy metering component (smart meter), and the fifth component 85 is a component that constitutes the UAN. The components may communicate with each other by means of a communication unit. In the network system illustrated in FIG. 8, each of the components is directly connected to the first component 70 to communicate with the first component 70. However, in a case where each of the components 82, 83, 84 and 85 is connected to new components to communicate with the new components, the network system may be extended and operated by the new components.

The second and third components 82 and 83 may be the same kind of component or different kinds of components. In this embodiment, it will be described as an example that the second and third components 82 and 83 are different kinds of energy consumption components.

The first component 70 may simply transmit information received from the fourth component 84 and/or the fifth component 85 to the second component 82 and/or the third component 83, or may process the received information and transmit the processed information.

The first component 70 may simply transmit information received from the second component 82 and/or the third component 83 to the fourth component 84 and/or the fifth component 85 (a signal may be converted), or may process the received information and transmit the processed information (the information is converted.

The first component 70 includes a communication unit 760 for performing communication with another component, a central manager 710 for managing the entire operation and/or information processing of the first component, and an application programming interface 720 (hereinafter, referred to as an 혻PI? for performing an interface between the communication unit 760 and the central manager 710 (specifically, application software).

The communication unit 760 includes a first communication part 762 for performing communication with the second and third components 82 and 83, a second communication part 764 for performing communication with the fourth component 84, and a third communication part 766 for performing communication with the fifth component 85.

In this instance, the first and second communication parts 762 and 764 may use different communication protocols from each other. As an example, the first communication part 762 may use Zigbee and the second communication part 764 may use Wi-fi. In this embodiment, the kind of communication protocol or method used by the first and second communication parts 762 and 764 is not limited. The third communication component 766 may use Internet communication as an example.

The API 720 includes a first API 722, a second API 724 and a third API 726. The third API 726 is an interface between the central manager 710 and the third communication part 766, and the first API 722 is an interface between the first communication part 762 and the central manager 710. The second API 724 is an interface between the second communication part 762 and the central manager 710.

The first component 70 further includes a local manager 740 and an interpreter 750. In a case where the information to be transmitted/received between the API 720 and the communication unit 760 is information related to operations of energy consumption components (electric home appliances), the local manager 740 outputs information corresponding to the respective energy consumption components. The interpreter 750 interprets information transmitted from the local manager 740 to the communication unit 760 or information received in the communication unit 760. The information outputted from the interpreter 750 is used to set or get values of information related to the respective energy consumption components.

The local manager 740 includes a memory (not shown) in which information related to one or more energy consumption components is stored. Alternatively, the local manager 740 may be connected to a memory in which information related to one or more energy consumption components is stored. The information related to each of the energy consumption components may include operation information of each of the energy consumption components and information for controlling the energy consumption components. The information related to each of the energy consumption components may further include software download information for operating each of the energy consumption components and information for remote controlling/monitoring.

As an example, in a case where a plurality of energy consumption components include a washing machine, a refrigerator and a cooking appliance, information related to each of the energy consumption components is stored in the memory. The information related to each of the energy consumption components may be changed as components connected to the network system are changed.

If a signal is transmitted from the API 720 to the local manager 740, information corresponding to a specific energy consumption component is outputted. In a case where a plurality of energy consumption components exist, information on the plurality of energy consumption components is outputted. The interpreter 750 interprets the information transmitted from the local manager 740 into a machine language so as to transmit the information to the energy consumption components. The machine language may be a signal used to set or get the operation information of the energy consumption components.

The information transmission process in the first component 70 will be described.

As an example, the first component 70 may receive energy information (e.g., an energy reduction signal: first command) from the forth component 45 through the second communication part 764. The received energy information is transmitted to the central manager 710 through the second API 724. In the process of information transmission between the second API 724 and the central manager 710, only a signal including the information is converted, and the content of the information is not converted.

Since the energy information is information related to the energy consumption reduction of the energy consumption components, the central manager 710 transmits information (second command) related to operations of the energy consumption components to the API 720. As an example, the central manager 710 transmits information necessary for turning off power of the washing machine or refrigerator.

Then, the information is transmitted from the first API 722 to the local manager 740.

The local manager 740 transmits information (third command) for controlling the operation of each of the energy consumption components to the interpreter 750 based on the information transmitted from the first API 722. As an example, in a case where the information transmitted from the first API 722 is information having different kinds of energy consumption components as targets, the local manager 740 transmits information related to the control of each of the energy consumption components to the interpreter 750. In this case, since the local manager 740 receives the second command and outputs the third command, the information inputted to the local manager 740 is converted and outputted by the local manager 740.

Subsequently, the interpreter 750 interprets the information transmitted from the local manager 740 into a machine language (signal). Then, the converted signal is transmitted to the target energy consumption components (second and third components) through the first communication part 762. Then, the energy consumption components (second and third components) are finally turned off so as to reduce energy.

Although it has been described above that the first component receives information through the second communication part, the first component may receive information through the third component so that the information related to the energy consumption components is outputted.

Meanwhile, the second and third components 82 and 83 may transmit their own operation information to the first component 70. Since the information transmitted from the second and third components 82 and 83 is information related to operations of the energy consumption components, the signal received in the first communication part 762 is transmitted to the central manager 710 via the interpreter 750, the local manager 760 and the first API 722. In such an information transmission process, the information related to the second and third components 82 and 83 is stored in the local manager 740. In this embodiment, since the information related to the energy consumption components is stored in the local manager, the local manager may be understood as a virtual energy consumption component (abstraction model).

The central manager 710 may transmit the received information to the second communication part 764 and/or the third communication part 766.

The operation of the first component will be described. The information received through the communication unit 760 may be transmitted directly to the API 720, or may be converted (via the interpreter and the local manager) and then transmitted to the API 720, based on the kind of information (or the type of signal).

The information transmitted from the central manager 740 may be transmitted directly to the communication unit 760, or may be converted and then transmitted to the communication unit 760.

As another example, the interpreter may be included in the local manager 740, and the information received through the communication unit 760 is transmitted to the local manager 740. However, converted information may be outputted, or information may be outputted as it is without converting the information.

Meanwhile, in a case where the information transmitted to the API 720 through the second or third communication part 764 or 766 is information (raw data or refined data) related to time-based pricing, the central manager 710 determines the presence of on-peak time. In the case of the on-peak time, the central manager 710 may transmit the information (first command) for controlling the operations of the energy consumption components to the API 720. Then, the information is converted through the local manager 740, and the converted information (second command) is transmitted to the energy consumption components through the first communication part 762. Alternatively, the central manager 710 may transmit the information related to the time-based pricing to the first communication part 762 through the second API 724 without determining the presence of on-peak time. In this case, the information may be converted or not converted. That is, in a case where the central manager directly receives first information (raw data), it may transmit the first information as it is, or convert the first information into a second information (refined data) and then transmit the second information.

Figure 10:
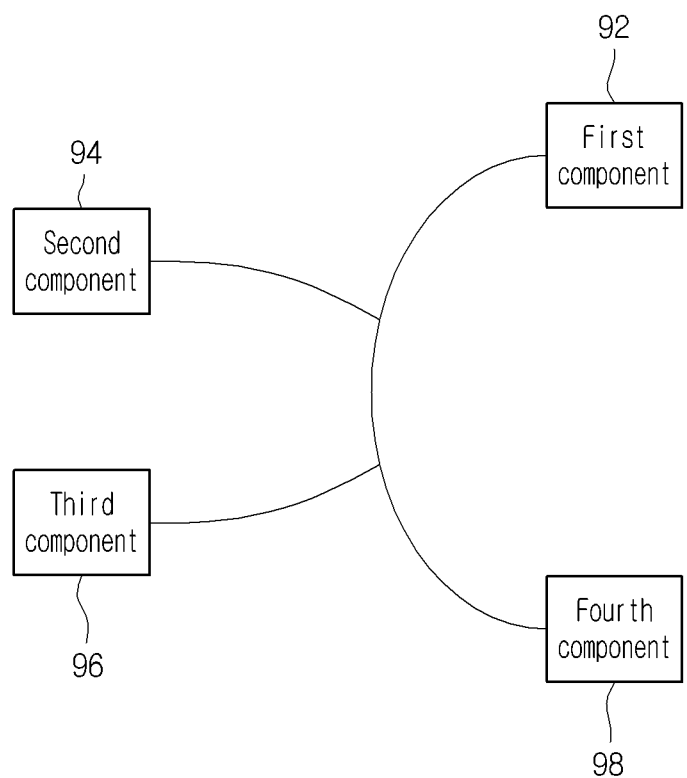
FIG. 10 is a view showing the communication structure of components that constitute the network system according to a fourth embodiment.
Figure 11:
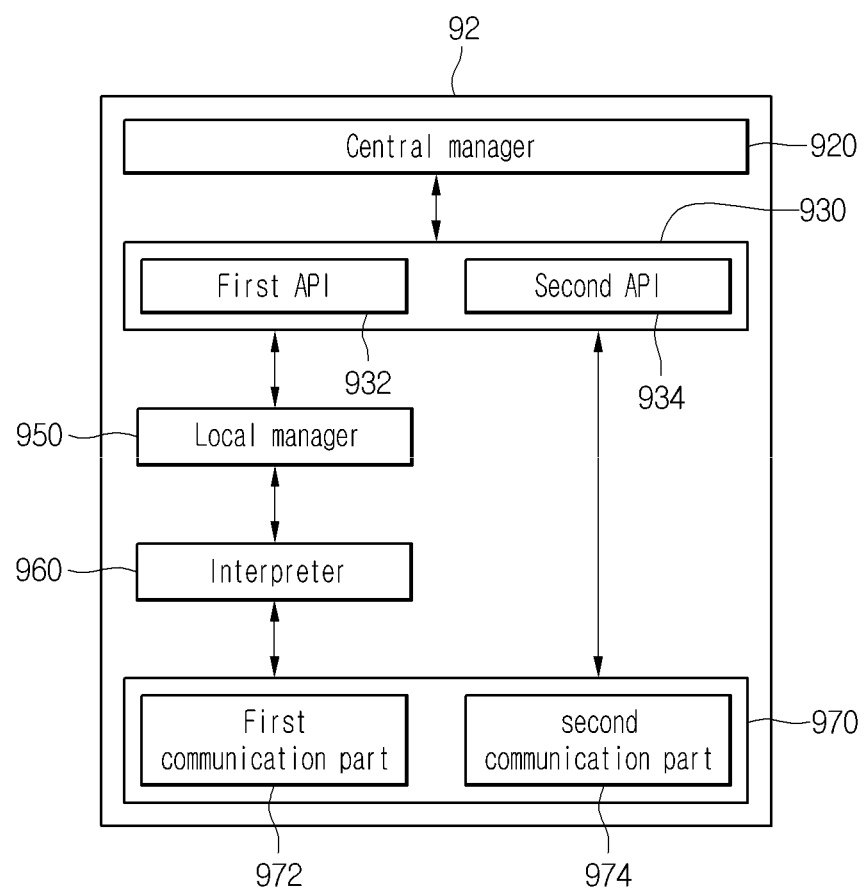
FIG. 11 is a block diagram showing the detailed configuration of a first component in FIG. 10.

FIG. 10 is a view showing the communication structure of components that constitute the network system according to a fourth embodiment. FIG. 11 is a block diagram showing the detailed configuration of a first component in FIG. 10.

Referring to FIGS. 10 and 11, the network system of this embodiment may include at least first to fourth components 92, 94, 96 and 98.

The first component 92 may communicate with the second to fourth components 94, 96 and 98. The fourth component 98 may communicate with the first to third components 92, 94 and 96.

Hereinafter, it will be described as an example that the first component 92 is a central management component (home server), the second and third components 94 and 96 are energy consumption components (electric home appliances), and the fourth component 98 is an energy metering component (smart meter).

The central management component (home server) may be understood as a component necessary for controlling at least a component that constitutes the HAN 20.

The first component 92 includes a communication unit 970 for performing communication with another component, a central manager 920 for managing the entire operation and/or information transmission/reception of the first component 92, and an application programming interface 930 (hereinafter, referred to as an "API") that serves as an interface between the communication unit 970 and the central manager 920 (specifically, application software).

The communication unit 970 may include a first communication component 972 for performing communication with the second to fourth components 94, 96 and 98, and a second communication component 974 for performing Internet communication.

The API 930 includes a first API 932 and a second API 934. The second API 934 is an interface between the central manager 920 and the second communication part 974, and the first API 930 is an interface between the first communication part 972 and the central manager 920.

The first component 92 further includes a local manager 950 and an interpreter 960. In a case where the information to be transmitted/received between the API 932 and the communication unit 970 is information related to operations of energy consumption components (electric home appliances), the local manager 950 outputs information corresponding to the respective energy consumption components. The interpreter 960 interprets information transmitted from the local manager 950 to the communication unit 970 or information received in the communication unit 970.

In this embodiment, the functions of the interpreter and the local manager are identical to those of the third embodiment, and therefore, their detailed descriptions will be omitted.

The information transmission process in the first component 92 will be described.

As an example, the first component 92 may receive energy information (e.g., energy reduction signal) from the fourth component 98 through the first communication part 972. Alternatively, the first component 92 may receive energy information from an external component connected to Internet through the second communication part 974.

The received energy information is transmitted directly to the first or second API 932 or 934 and then transmitted to the central manager 920. Since the energy information is information related to the energy consumption reduction of the energy consumption components, the central manager 920 transmits information related to the operations of the energy consumption components to the first API 932. As an example, the central manager 920 transmits information necessary for turning off power of a washing machine or refrigerator.

Then, the information is transmitted from the first API 932 to the local manager 950.

The local manager 950 transmits information for controlling the operation of each of the energy consumption components to the interpreter 960 based on the information transmitted from the first API 932. As an example, in a case where the information transmitted from the first API is information related to different kinds of energy consumption components, the local manager 950 transmits information related to the control of each of the energy consumption components to the interpreter 960.

Subsequently, the interpreter 960 interprets the information transmitted from the local manager 960 into a machine language (signal). Then, the interpreted signal is transmitted to the energy consumption components through the first communication part 972. Then, the energy consumption components are finally turned off so as to reduce energy.

Meanwhile, the second and third components 94 and 96 may transmit their own operation information to the first component 92. Since the information transmitted from the second and third components is information related to the operations of the energy consumption components, the signal received in the first communication part 972 is transmitted to the central manager 920 via the interpreter 960, the local manager 950 and the first API 932. In such an information transmission process, the information related to the first and second components is stored in the local manager 950.

The central manager 920 may transmit the received information to the first communication part 972. Then, the information of the second and third components 94 and 96 is transmitted to the fourth component 98.

The operation of the first component will be described. The information received through the communication unit 970 may be transmitted directly to the API 930, or may be converted (via the interpreter and the local manager) and then transmitted to the API 930, based on the kind of information (or the type of signal).

On the contrary, the information transmitted from the central manager 920 may be transmitted directly to the communication unit 970, or may be converted and then transmitted to the communication unit 970.

Meanwhile, in a case where the information transmitted to the API 930 through the second communication part 974 is information related to time-based pricing, the central manager 920 determines the presence of on-peak time. In the case of the on-peak time, the central manager 920 may transmit the information for controlling the operations of the energy consumption components to the API 930. Then, the information is transmitted to the energy consumption components through the local manager, the interpreter and the first communication part. In this case, the first component may be understood as an energy management component.

Although it has been described above that two energy consumption components communicate with the first component, the number of energy consumption components that communicate with the first component is not limited.

Although it has been described as an example that the first component is a home server, the first component may be an energy management component. In this case, the fourth component may be a central management component, an energy management component, a smart meter, or the like.

As another example, the first component may be a smart meter. In this case, the fourth component may be a central management component, an energy management component, or the like.

As still another example, the first component may be a terminal component (e.g., a gate way).

As still another example, each of the second and third components may be an energy generation component, an energy storage component or the like, which constitutes the HAN. That is, one or more of the energy generation component, the energy consumption component and the energy storage component may communicate with the first component. In addition to information related to the energy consumption component, information related to the energy generation component (e.g., information related to the operation of the energy generation component) and information related to the energy storage component (e.g., information related to the operation of the energy storage component) may be stored in the memory included in a local network or connected to the local network.

Although it has been described above that the first component performs Internet communication, the Internet communication may not be performed.

Although it has been described in the first embodiment that a single local manager is provided, a plurality of local managers may be provided. As an example, a first local manager may process information on an electric home appliance such as a refrigerator or washing machine, and a second local manager may process information on a display product such as a television or monitor.

Figure 12:
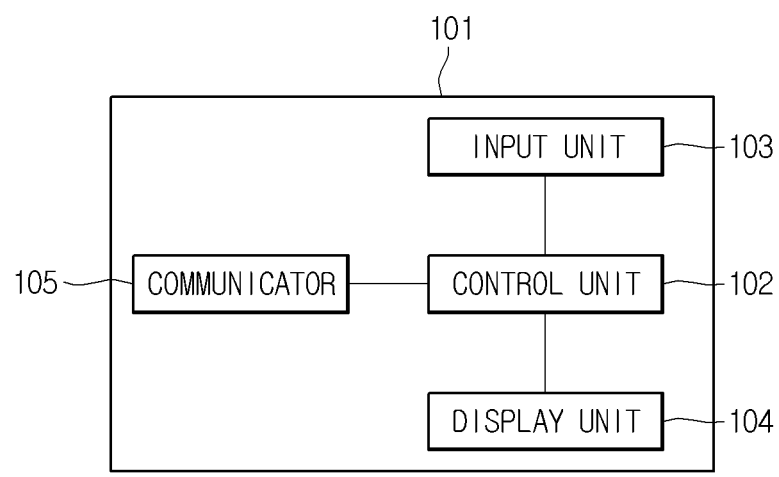
FIG. 12 is a block diagram showing an example an example of a component that constitutes the network system of the present disclosure.
Figure 13:
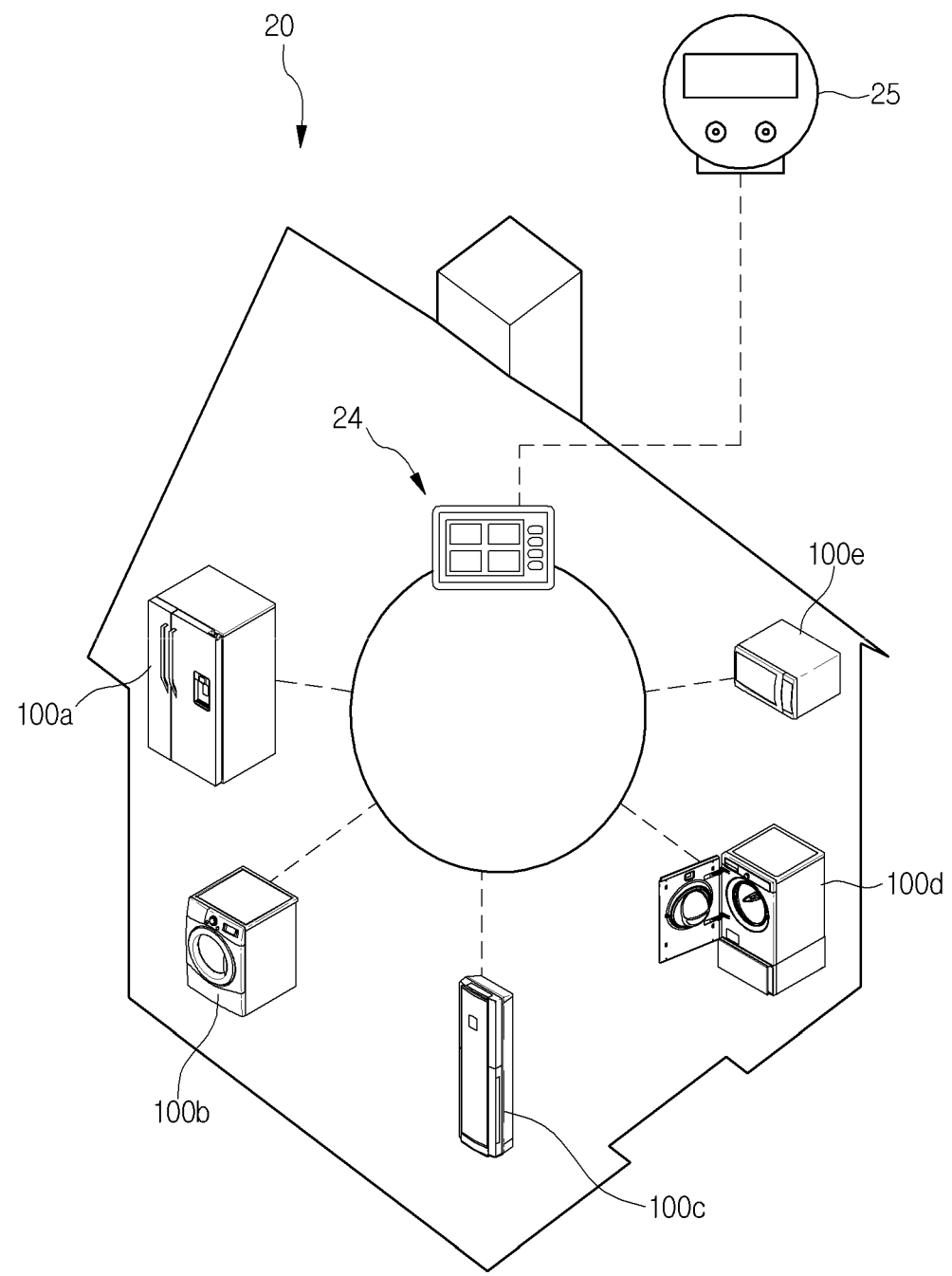
FIG. 13 is a schematic view illustrating a home network according to an embodiment.

FIG. 12 is a block diagram showing an example an example of a component that constitutes the network system of the present disclosure. The following component 100 may be one component of the UAN or HAN.

Referring to FIG. 12, the component 101 may include a control unit 102, an input unit 103 for inputting an operational command, and a display unit 104 for displaying information. In this instance, the input unit 103 may be provided in the form of a touch screen to the display unit 104. The control unit 102 may communicate with a communicator 105.

The component 100 may further include a sensor, a driver, a memory and the like according to the kind of the component 100. The input unit or display unit may not be provided to the component 100 according to the kind of the component 100. The component 100 may be a function performing component, or may include the function performing component.

As another example, the component 100 may be supplied with energy form a plurality of energy generation units. Specifically, the plurality of energy generation units may be a utility network different from each other. In this case, the ratio of energy transmitted from a plurality of energy generation units according to energy information may be changed. That is, in a case where the energy cost of a first energy generation unit is lower than that of a second energy generation unit, more energy in the first energy generation unit may be supplied to the component 100. In this case, the amount of energy supplied form each energy generation unit or the energy ratio may be displayed in the display unit 130 of the component 100. Alternatively, one of a plurality of energy generation units may constitute a utility network, and the other may constitute a home area network. Even in this case, the energy ratio transmitted from a plurality of energy generation units in accordance with energy information may be changed.

As another example, the component may include a plurality of function performing components in which the energy is consumed to generate energy. The energy generated in the plurality of function performing components may be supplied to the outside. Here, energy supply ratios in the plurality of function performing components may be varied. Alternatively, an order of priority of the energy supply of the plurality of function performing components may be determined.

Figure 14:
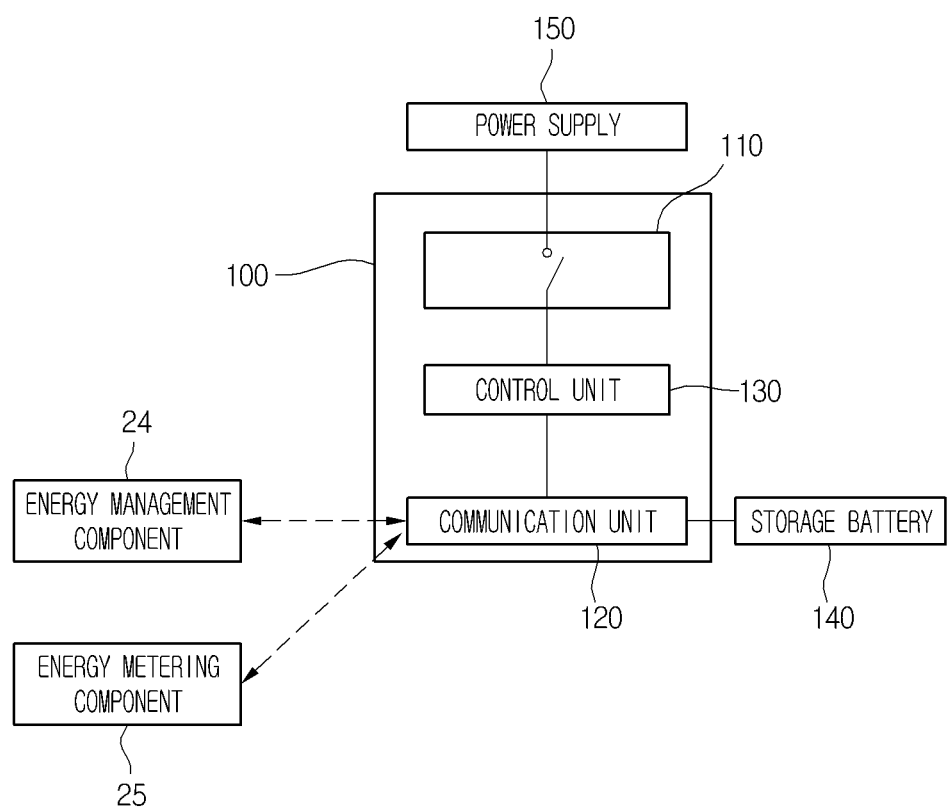
FIG. 14 is a block view illustrating a network system including the energy consumption component 100 according to an embodiment.

FIG. 14 is a block view illustrating a network system including the energy consumption component 100 according to an embodiment.

Referring to FIG. 14, the network system including the energy consumption component 100 includes the energy metering component 25 recognizing one of energy information and additional information except for the energy information, the energy management component 24 controlling driving of the energy consumption component 100 according to the energy information or the additional information, and a communication unit 120 for communicating with one of the energy management component 24 and the energy metering component 25. The energy metering component 25 and the energy management component 24 may be connected to each other for mutual communication. The communication unit 120 may be provided in the energy consumption component 100 or provided to be connectable with the energy consumption component 100.

The network system includes a power supply 150 supplying power to the energy consumption component 100, a switch 110 provided in the energy consumption component 100 to selectively supply power to the communication unit 120, and a control unit 130 controlling the switch 110. The power supply 150 may be an electrical outlet provided in a house or a building, which may be an alternating current (AC) power supply.

The network system includes a storage battery 140 selectively supplying power to the communication unit 120 as an energy storage component. The storage battery 140 may be provided inside the energy consumption component 100 or may be connected to the outside of the energy consumption component 100 to be capable of transmitting power.

The storage battery 140 may be charged while the energy consumption component 100 is being operated. When power of the energy consumption component 100 is turned off or the energy consumption component 100 is not used (in a standby power mode), the storage battery 140 supplies power for driving the communication unit 120. In this case, the standby power mode indicates a state in which the energy consumption component 100 is not driven. In the standby power mode, driving power of the energy consumption component 100 is not provided and only basic functions such as a memory and a display are maintained.

Though power of the energy consumption component 100 is turned off or the energy consumption component 100 is in the standby power mode, the communication unit 120 needs power for communication with the energy management component 24 or the energy metering component 25. Such power may be provided from the storage battery 140.

Figure 15:
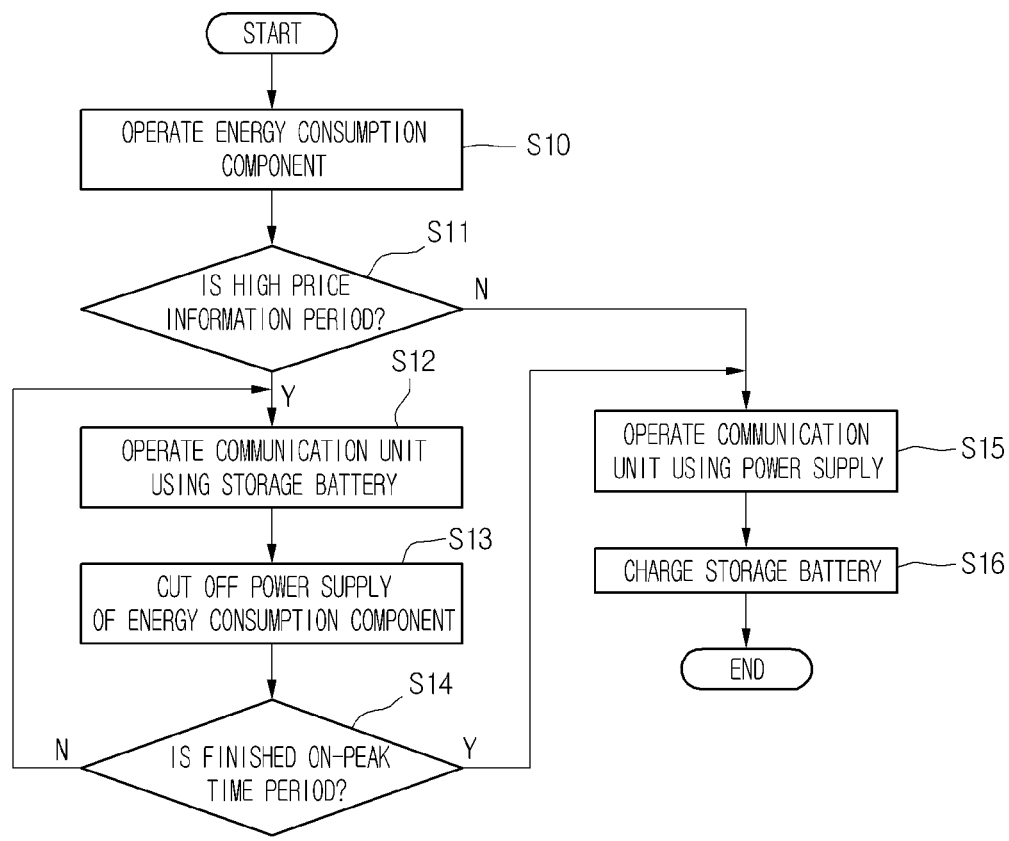
FIG. 15 is a flowchart illustrating a method of controlling the network system according to an embodiment.

FIG. 15 is a flowchart illustrating a method of controlling the network system according to an embodiment. Referring to FIG. 15, the method of controlling the network system will be described.

When the energy consumption component 100 is operated, the communication unit 120 may receive the information, that is, one of the energy information and the additional information except the energy information from one the energy management component 24 and the energy metering component 25 (S10).

While the energy consumption component 100 is being operated, it is determined whether high-price information period has come. In detail, it is determined whether the information is recognized to restrict driving the energy consumption component 100, for example, whether the information is recognized as energy cost information that is more than a preset reference value (on-peak time period) (S11). When being recognized as the high-price information period, power of the storage battery 140 is used to drive the communication unit 120 (S12).

Also, the energy consumption component 100 may be controlled to reduce a power consumption amount or electricity cost. In other words, power provided to the energy consumption component 100 may be cut off. In this case, the power consumption amount of the energy consumption component 100 may be reduced. Though the power provided to the energy consumption component 100 is cut off, the communication unit 120 may receive power from the storage battery 140 and easily perform communication. The communication unit 120 is one component driven by the storage battery 140 when power supply for the energy consumption component 100 is restricted, that is, the power of the energy consumption component 100 is cut off or the energy consumption component 100 is in the standby power mode (S13).

On the contrary, when the information is not recognized as the high-price information period, for example, as a low-price information period, power of the power supply 150 may be used to drive the communication unit 120. Also, the storage battery 140 may be charged by the power of the power supply 150 while the energy consumption component 100 is being operated.

On the other hand, after S13, it is determined whether the high-price information period is finished (S14). When the high-price information period is finished, process after S15 will be performed. That is, the communication unit 120 is operated and the storage battery 140 is charged using the power supply 150 (S15 and S16). However, in case where the high-price information period is not finished, S12 is performed again.

As described above, when one of the energy information and the additional information except the energy information is determined to be high-price information and use of the energy consumption component 100 is restricted, power supplied to the energy consumption component 100 is cut off and communication may be performed using power of the storage battery 140. Accordingly, one of power consumption and energy cost may be reduced and communication between components constituting the network system, particularly, the energy consumption component and one of the energy management component and the energy metering component may be smoothly performed.

Figure 16:
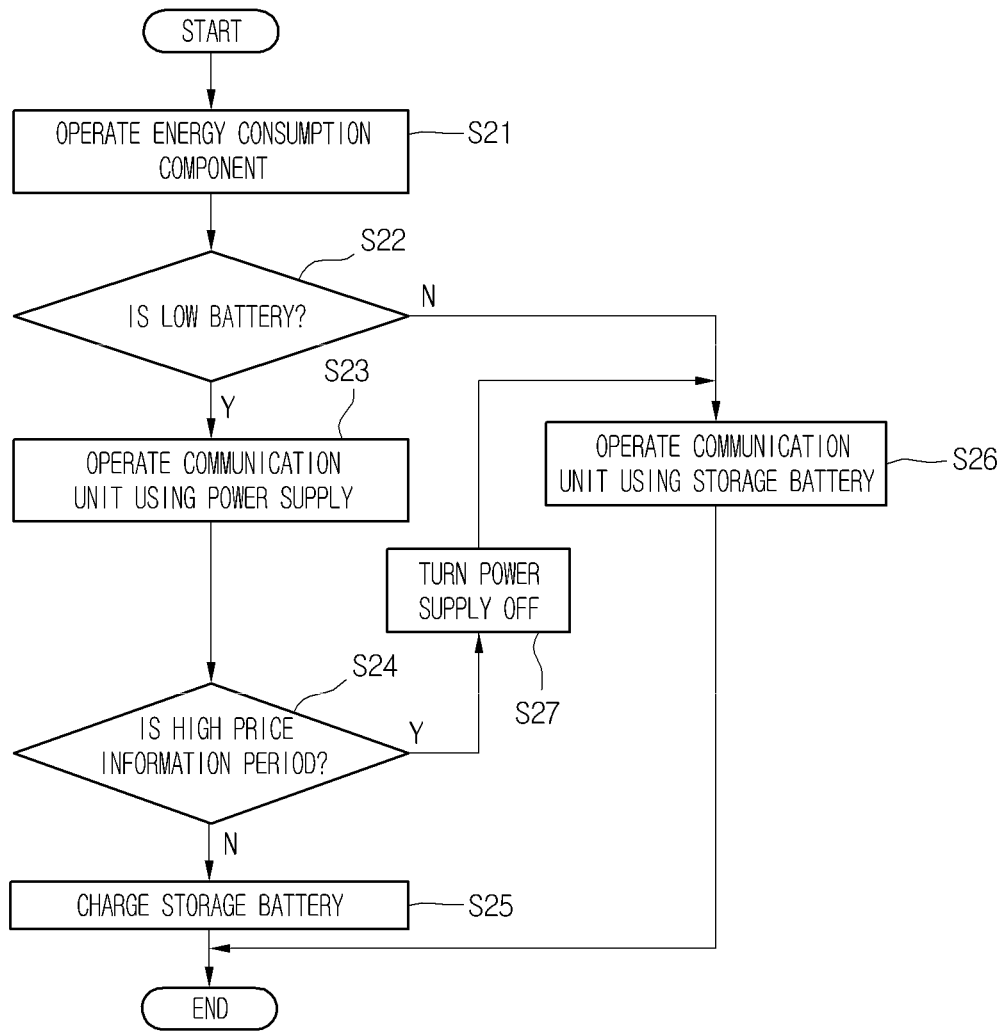
FIG. 16 is a flowchart illustrating a method of controlling the network system according to another embodiment.

FIG. 16 is a flowchart illustrating a method of controlling the network system according to another embodiment. Referring to FIG. 16, the method of controlling the network system will be described. The present embodiment relates to a method of controlling the network system according to a charging state of the storage battery 140.

When the energy consumption component 100 is operated, the communication unit 120 may receive the information, that is, one of the energy information and the additional information except the energy information from one of the energy management component 24 and the energy metering component 25 (S21). While the energy consumption component 100 is being operated, it is determined whether the charging state of the storage battery 140 is low (S22).

When it is determined that the charging state of the storage battery 140 is low, that is, the storage battery 140 is lacking in charging, power of the power supply 150 may be supplied to drive the communication unit 120 (S23). On the contrary, when the charging state of the storage battery 140 is high, that is, charging is fully performed, power of the storage battery 140 may be supplied to drive the communication unit 120. In other words, since power at least to drive the communication unit 120 is supplied from the storage battery 140, currents or power supplied from the power supply 150 may be reduced (S26).

When performing S23, it is determined whether a high-price information period has come (S24). In detail, it is determined whether the information is recognized to limit driving of the energy consumption component 100, for example, whether the information is energy cost information and is more than a preset reference value (on-peak time period).

When it is recognized as the high-price information period, the power supply from the power supply 150 is cut off and the power of the storage battery 140 is used to drive the communication unit 120 (S27 and S26). Accordingly, power supplied to the energy consumption component 100 may be cut off, and the power consumption amount of the energy consumption component 100 may be reduced (S27 and S26).

On the contrary, when the information is not recognized as the high-price information period, the power of the power supply 150 may be used to drive the communication unit 120. Also, by the power of the power supply 150, the storage battery 140 may be charged while the energy consumption component 100 is being operated (S25).

As described above, depending on whether the storage battery 140, driving power of the communication unit 120 may vary. Also, depending on whether the on-peak time period has come, power consumption of the energy consumption component 100 may be cut off and communication may be performed using power of the storage battery 140. Accordingly, electric power or energy cost may be reduced, and communication between components constituting the network system, particularly, between the energy consumption component 100 and one of the energy management component 24 and the energy metering component 25 may be smoothly performed.

Hereinafter, there will be described still another embodiment. Since there is a difference only in a part of configuration from the previous embodiment, the difference will be mainly described and the same parts employ the description and reference numerals of the previous embodiment.

Figure 17:
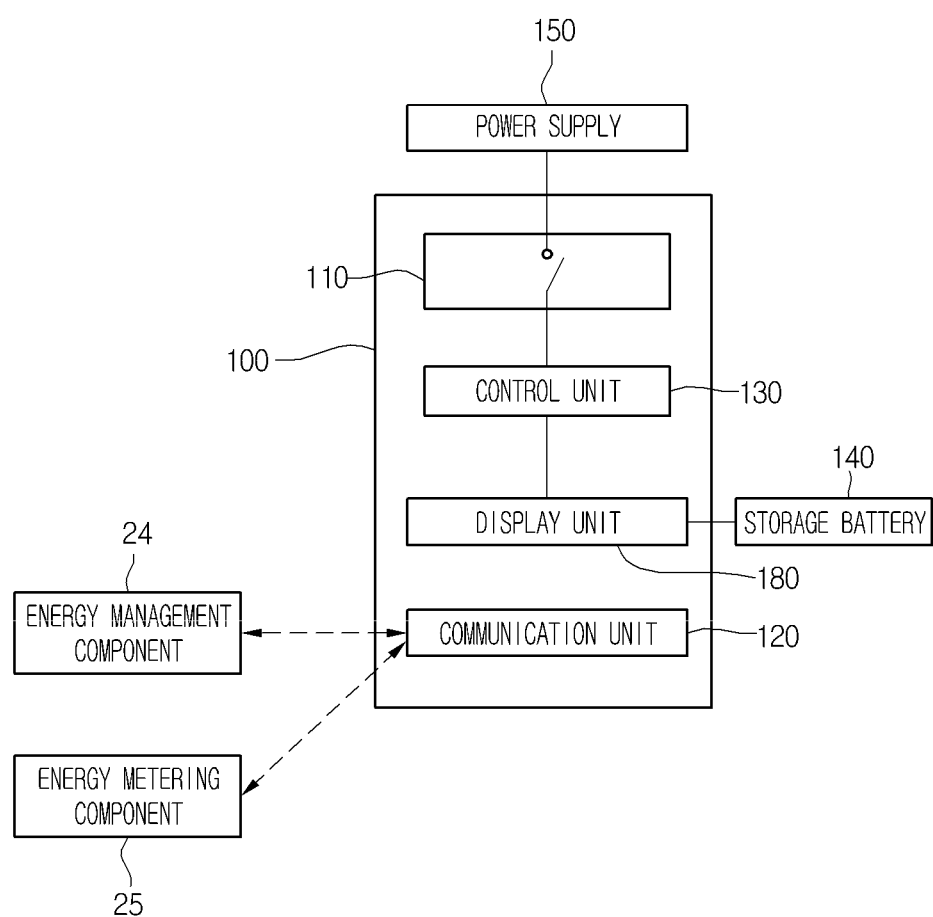
FIG. 17 is a block diagram illustrating a network system including the energy consumption component 100 according to another embodiment.

FIG. 17 is a block diagram illustrating a network system including the energy consumption component 100 according to another embodiment.

Referring to FIG. 17, the network system according to still another embodiment includes the energy consumption component 100 consuming energy. The energy consumption component 100 includes a display unit 180 displaying an operation state of the energy consumption component 100. As described with reference to FIG. 14, when the energy consumption component 100 is in a standby power mode, though power supply to drive the energy consumption component 100 is restricted, power for driving the display unit 180 may be supplied.

The network system includes a power supply 150 supplying power to the energy consumption component 100, the switch 110 provided in the energy consumption component 100 allowing power supply of the display unit 180 to be selectable, and the control unit 130 controlling the switch 110.

The network system further includes the storage battery 140 as an energy storage selectively supplying power to the display unit 180. The storage battery 140 may be provided inside the energy consumption component 100 and may be connected to the outside of the energy consumption component 100 to be capable transmitting electric power.

The storage battery 140 may be charged while the energy consumption component 100 is being operated and supplies power to drive the display unit 180 when power of the energy consumption component 100 is turned off or the energy consumption component 100 is in a standby power mode. Accordingly, the display unit 180 may be a component driven by the storage battery 140 when power supply for the energy consumption component 100 is restricted, that is, the power of the energy consumption component 100 is cut off or the energy consumption component 100 is in the standby power mode.

There will be described the workings of the network system according to the present embodiment in brief.

Based on information transferred from one of the energy management component 24 and the energy metering component 25, it is not recognized as a high-price information period, for example, off-peak time period, the switch 110 is operated and power of the power supply 150 may be supplied to the display unit 180. On the contrary, based on information transferred from one of the energy management component 24 and the energy metering component 25, it is recognized as a high-price information period, the control unit 130 controls the switch 110 to connect the storage battery 140 to the display unit 180.

Accordingly, power of the storage battery 140 may be supplied to the display unit 180 in a high-price information period. On the other hand, when the energy consumption component 100 is in a standby power mode, the power supplied from the power supply 150 may be cut off. Since power to drive the display unit 180 in the standby power mode may be supplied from the storage battery 140, energy cost may be reduced by cutting off the power of the power supply 150.

Figure 18:
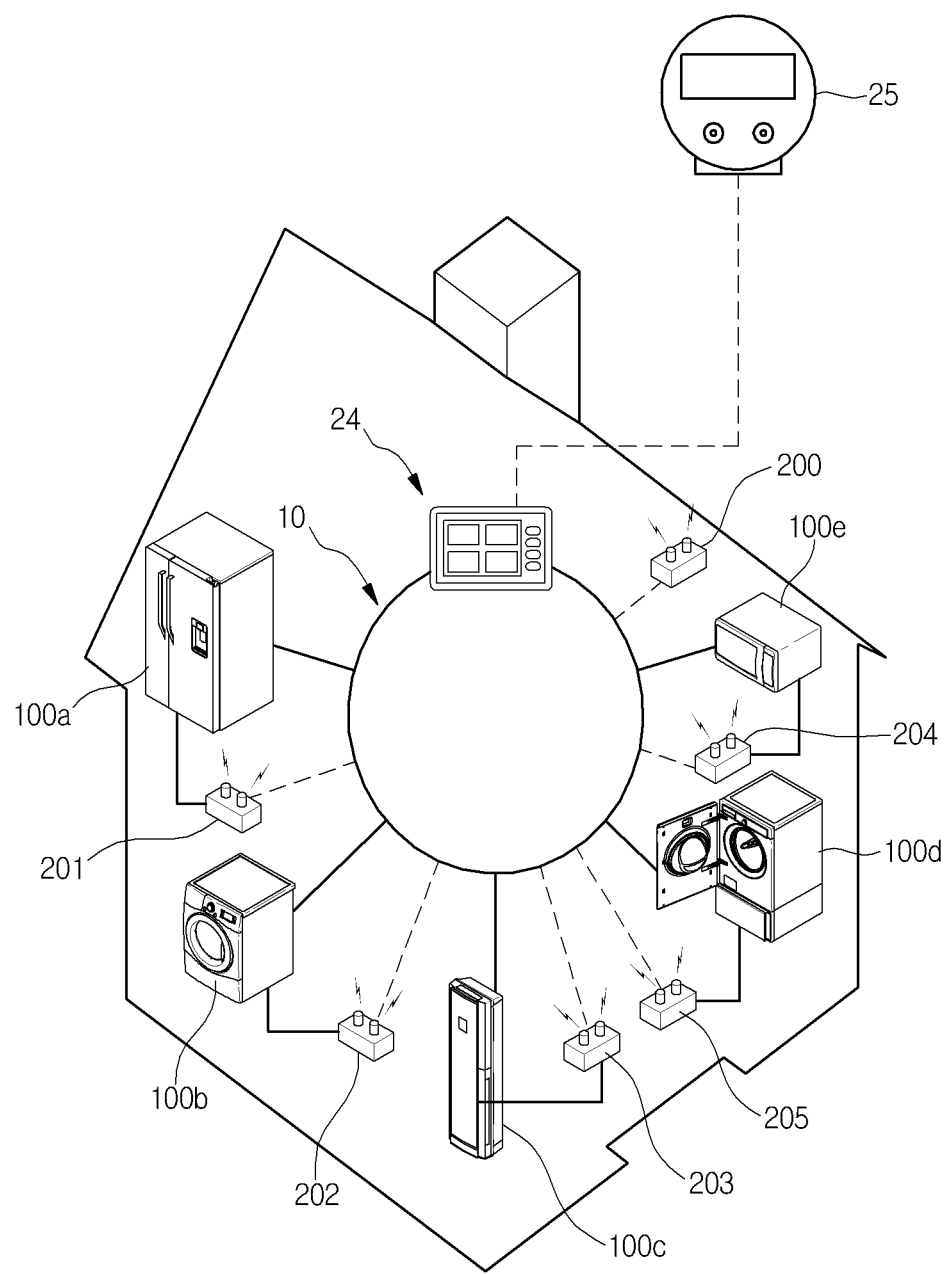
FIG. 18 is a schematic view illustrating a home area network according to another embodiment.

Hereinafter, there will be described another embodiment. FIG. 18 is a schematic view illustrating a home area network according to another embodiment.

Referring to FIG. 18, a power supply network system 10 includes the energy metering component 25 that is a smart meter capable of metering an amount of power supplied to each residential customer and electricity cost thereof in real time and the energy management component 24 that is an energy management system (EMS) connected to the energy metering component 25 and a plurality of electric apparatuses such as electric products and controlling the operations thereof.

The EMS is connected to electric products such as the refrigerator 100a, the washing machine 100b, the air cleaner 100c, the drying machine 100d, and cooking appliances 100e and performs two-way communication therewith.

On the other hand, storage batteries 200 to 205 capable of supplying power solely or in common to the respective electric products if necessary and each of the storage batteries 200 to 205 is connected to one another. The storage batteries 200 to 205 receive and store external power and supply to the electric products when necessary.

The respective electric products are provided with the storage batteries 201 to 204, and each of the storage batteries 201 to 204 is connected to one another. On the other hand, a power consumer, that is, in-house network itself is connected to the common storage battery 200 capable of being used in common.

The common storage battery 200 has a large capacity of storing electricity, being compared to those of the storage batteries 201 to 205 connected to the respective electric products and functions as a supplier for the respective electric products. That is, the storage batteries 201 to 204 connected to the respective electric products function as providing corresponding electric products, and the common storage battery 200 may provide all the electric products connected to a power network.

The common storage battery 200 and the storage batteries 201 to 204 may communicate with the EMS 24. In the common storage battery 200 and the storage batteries 201 to 204, electricity may be stored according to an electricity storing command of the EMS 24. Also, the common storage battery 200 and the storage batteries 201 to 204 may supply the electricity stored according to the electricity storing command of the EMS 24 to the electric products to which the respective storage batteries are connected or may supply to other electric products.

Meanwhile, the EMS 24 may be provided inside the electric home appliance continuously operated for 24 hours such as the refrigerator 100a.

In the present embodiment, the common storage battery 200 and the storage batteries 201 to 204 connected to the respective electric products, and the EMS 24 used for storing electricity thereof, and the electric products to which the storage batteries 201 to 204 are connected are commonly designated as devices. As a method of controlling the device may be considered as one of a method of controlling the EMS giving the electricity storing command to store electricity or the respective electric products and a controlling method of the common storage battery 200 independently storing electricity or the storage batteries 201 to 204 connected to the respective electric products.

Figure 19:
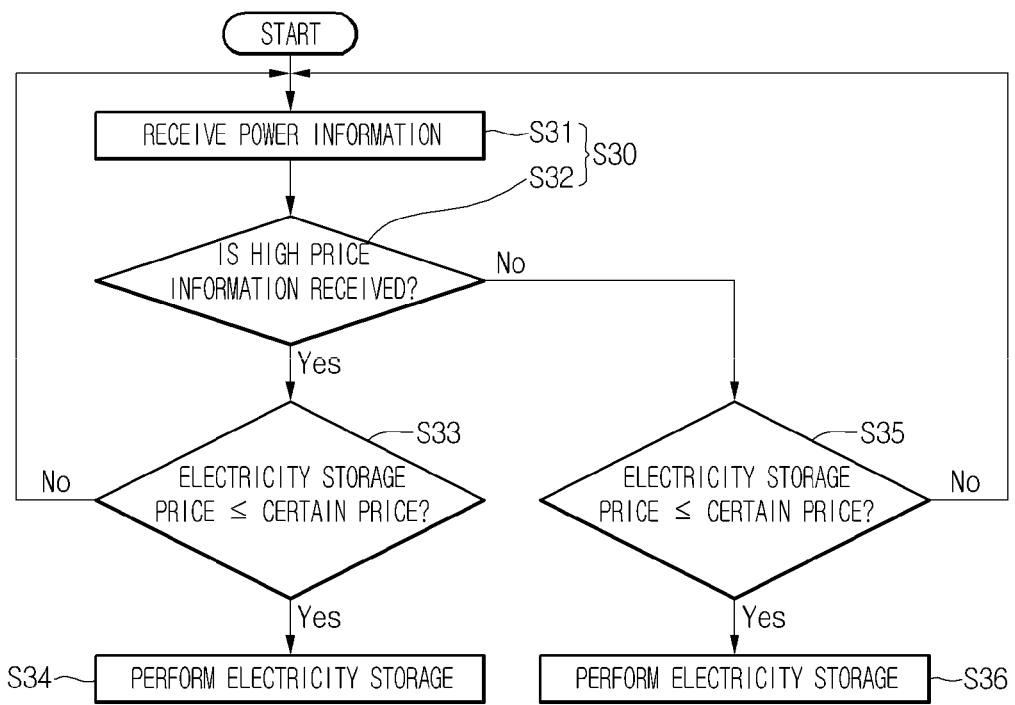
FIG. 19 is a flowchart illustrating a method of controlling a device according to an embodiment.
Figure 20:
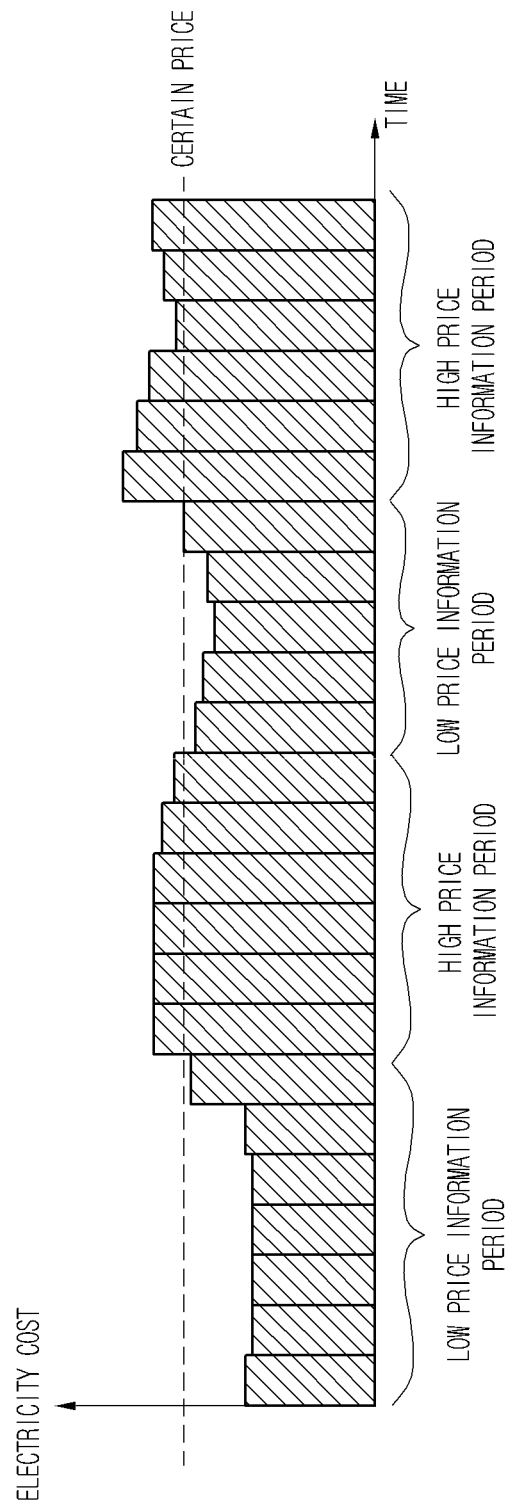
FIGS. 20 to 22 are graphs illustrating an electricity cost varying with a certain time period and electricity storage time periods related to the present embodiment.
Figure 21:
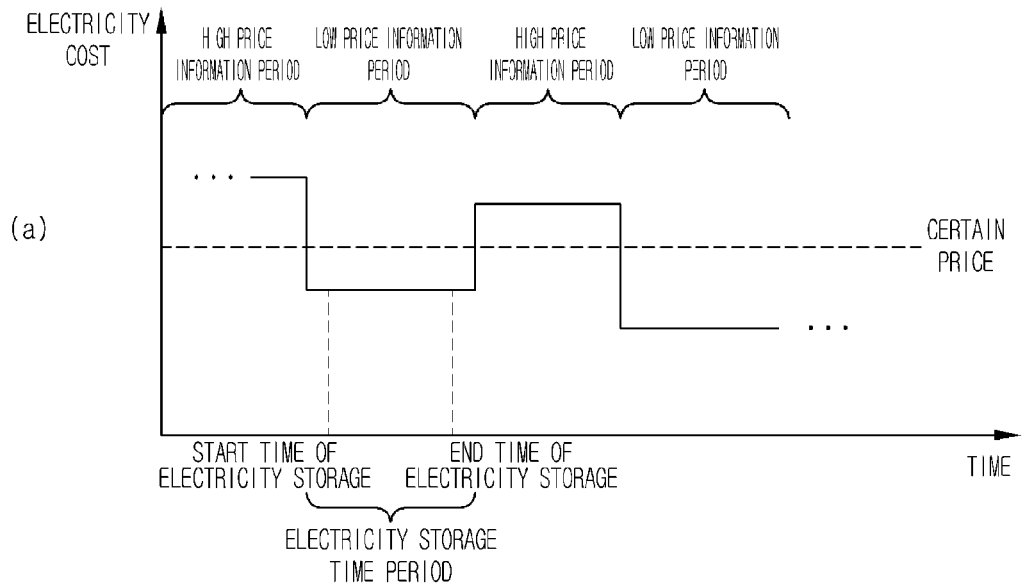
Figure 21:
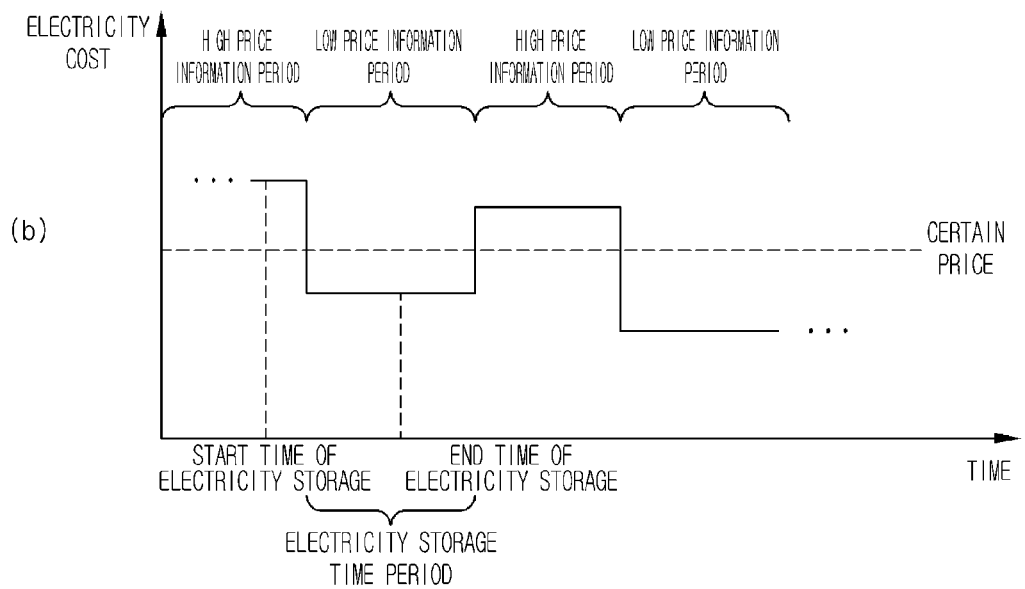
Figure 22:
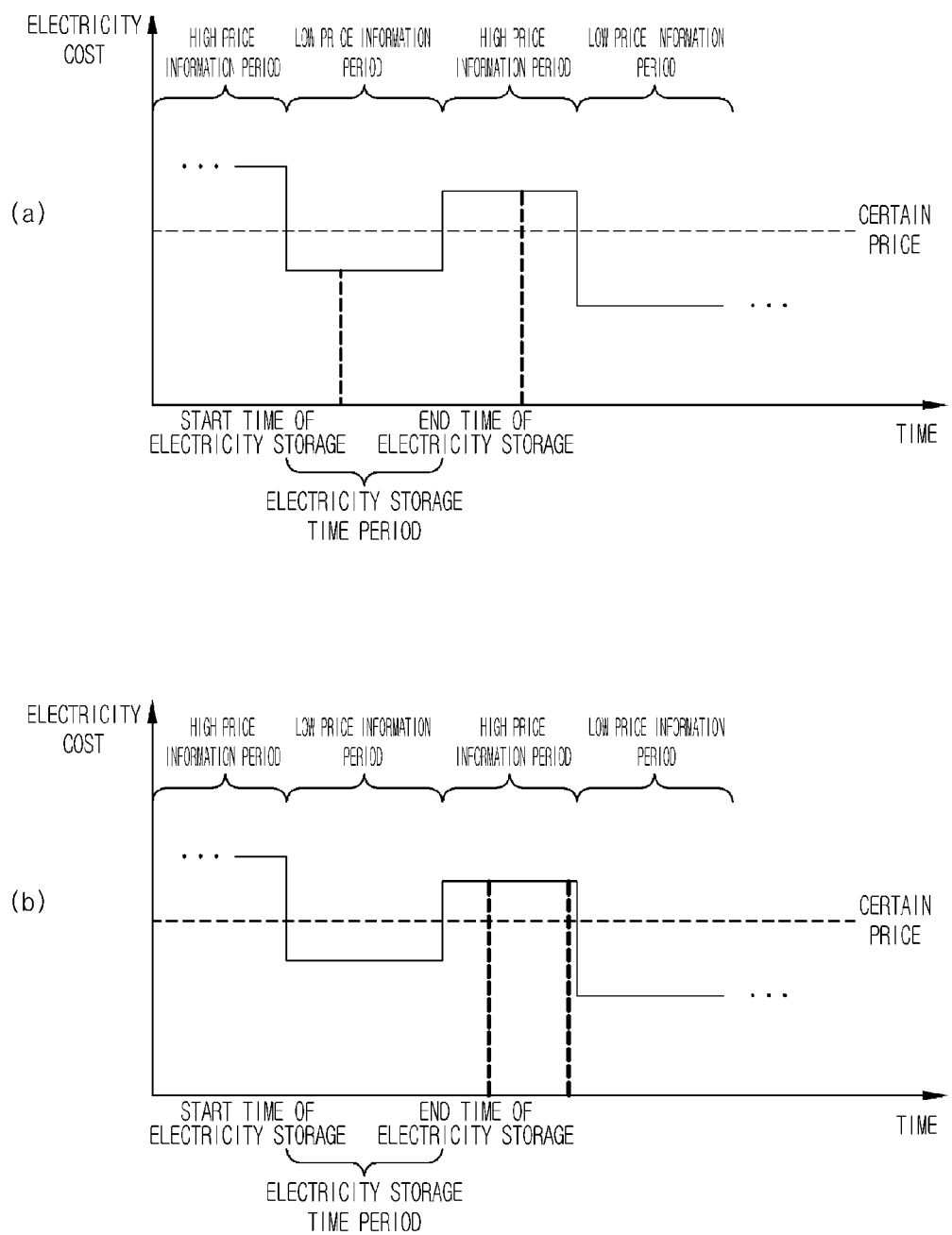

FIG. 19 is a flowchart illustrating a method of controlling a device according to an embodiment. FIGS. 20 to 22 are graphs illustrating an electricity cost varying with a certain time period and electricity storage time periods related to the present embodiment.

Referring to FIG. 19, the method of controlling a device includes steps of recognizing whether electric power information including electricity cost is corresponding to a high price information period or a low price information period (S30), comparing a electricity storage cost in an electricity storage time period with a certain price (S33 and S34), and performing electricity storage for the electricity storage time period when the electricity storage cost is less than the certain price (S35 and S36).

The electric power information may include electric power information of a grid power source and electric power information of a distributed power source such as new & renewal energy, and the electric power information of the distributed power source may include climate information and drive information of the distributed power source. In this case, the drive information of the distributed power source may include one or more of an electricity producing rate, an electricity generation cost, and electricity cost by reflecting the climate information. That is, depending on a degree of electricity cost, the grid power source and the distributed power source may be selectively used to store electricity.

The step of recognizing (S30) may include steps of collecting and obtaining electric power information (31) and processing or determining the obtained electric power information (S32). In addition, the step of collecting and obtaining the electric power information may include the step of receiving the electric power information from a power provider. Also, the step of processing the electric power information may be performed by one of the user and the power provider and may be calculated by one of MYCOM for controlling the driving of the device and EMS described above.

On the other hand, referring to FIG. 20, the step of recognizing the high price information period and the low price information period may be performed by one of comparing the electric power information provided to the device with the certain price preset in the device and information regarding the high price information period and the low price information period provided from the outside of the device.

In an intellectual power grid, for example, an electricity cost may vary with a certain day, a certain week, or a certain month, and more particularly, a certain time in the certain day. For example, the electricity cost is determined to be expensive in an on-peak time period with a large amount of power consumption more than that in an off-peak time period with relatively small amount of power consumption. Also, the power provided under the intellectual power grid may provide electricity cost information for each time period divided with a predetermined time interval to the user.

Referring to (a) in FIG. 21, the electricity storage time period may be a time period with both a start time and an end time belonging to the low price information period. Different from this, referring to (b) in FIG. 21, the electricity storage time period may be a time period with a start time belonging to the high price information period and with an end time belonging to the low price information period.

On the contrary, referring to (a) in FIG. 22, the electricity storage time period may be a time period with a start time belonging to the low price information period and with an end time belonging to the high price information period. Different from this, referring to (b) in FIG. 22, the electricity storage time period may be a time period with both a start time and an end time belonging to the high price information period.

In other words, all the electricity storage time period may be included in the low price information period, a part of the electricity storage time period may be included in the high price information period, and all the electricity storage time period may be included in the high price information period. On the other hand, the electricity storage time period may be one of a continuous time period and a plurality of time intermittent time periods.

The method of controlling a device according to the present embodiment includes, to perform electricity storage with a lower price, steps of comparing an electricity storage cost of the electricity storage time period with a certain price and performing the electricity storage for the electricity storage time period when the electricity storage cost is less than the certain price. In this case, the certain price may be determined based on one of an electricity storage allowance price, an estimated time of driving a certain device, a power consumption amount of the certain device, and power information of a time period including the estimated time of driving the certain device.

That is, the certain price may be determined as an electricity storage allowance price previously determined by the user regardless of high price or low price information periods, in which the electricity storage may be performed for the electricity storage time period when the electricity storage cost is less than the electricity storage allowance price.

Also, the certain price may be determined based on the power information of the time period including the estimated time of driving the device using stored electricity, for example, an electricity cost of a grid power source, in which the electricity storage may be performed for the electricity storage time period when the electricity storage cost is less than the electricity cost of driving the device. Also, the performing the electricity storage for the electricity storage time period may be automatically performed by one of an input of the user and MYCOM for controlling driving the device. Also, the certain price may be determined by one of the user and MYCOM controlling driving the device, and a power supply source providing the power information.

Until now, though there has been described a case where an electricity cost and an electricity storage cost of one external power source such as a grid power source are compared with each other and the electricity storage is performed when the electricity cost is less than a certain price, the present embodiment is not limited to the one external power source but is able to be applied to a case of receiving power from a plurality of external power sources. In this case, the plurality of power sources may include a grid power source, for example, Korean Electric Power Corporation (KEPCO) and a plurality of distributed power sources, for example, solar heat, geothermal heat, and wind power.

A method of controlling a device according to another embodiment includes steps of recognizing one or more pieces of grid power information including an electricity cost of grid power source and one or more pieces of distributed power information including an electricity cost of a distributed power source, comparing an electricity storage cost in an electricity storage time period via one of the grid power source and the distributed power source with a certain price, and performing electricity storage for the electricity storage time period when the electricity storage cost using any one of the power sources is less than the certain price.

That is, the device may be controlled to recognize power information such as the electricity cost provided from one of the grid power source and the distributed power source, calculate electricity storage costs of storing electricity using the respective power sources, compare the electricity storage cost with the certain price, and perform electricity storage for the electricity storage time period when the electricity storage cost using any one of the power sources is less than the certain price.

As described above, according to the method of controlling the device according to an embodiment, under a power grid in which power information varies with a certain time period, the power information may be recognized, it may be determined by comparing an electricity storage cost with a certain price whether to perform electricity storage, and power may be efficiently used.

There is provided another embodiment.

Figure 23:
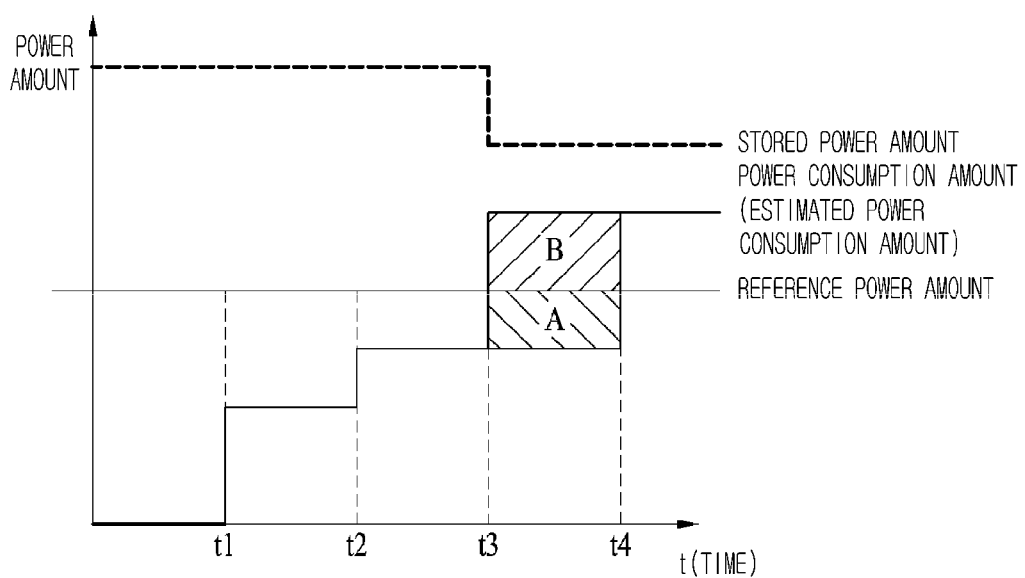
FIG. 23 is a view illustrating relations among power stored in an electricity storage device, a power consumption amount, and a reference power amount

FIG. 23 is a view illustrating relations among power stored in an electricity storage device, a power consumption amount, and a reference power amount, in which the power stored in the electricity storage device may be provided to electric products if necessary, thereby reducing the power as time elapses as shown in FIG. 23.

When the power is stored in the electricity storage device, an electric product may periodically meter a power consumption amount that is a consumption amount of power supplied from a power supply source.

When the electric product operates while performing unique function thereof, an amount of power consumed by the electric product may be increased as time elapses as shown in FIG. 23. As setting a shorter period of metering a power consumption amount, a change in an amount of power consumed by the electric product becomes an actual one.

In addition, a difference between the reference power amount previously set and the metered power consumption amount is determined and a ratio of an amount of power supplied from a power supply source to an amount of using power stored in the electricity storage device is determined depending on the difference between the reference power amount and the power consumption amount.

The reference power amount may be determined by the user as a maximum power consumption amount allowed to an electric product while using the electric product. However, the reference power amount may be previously set by the manufacturer of the electric product or may be set arbitrarily from power information received by one of the in-house energy management system and the energy metering component 25 from a central energy management system.

Additionally, when a plurality of electric products are connected to one another via an in-house network, the reference power amount may be defined to be a maximum power consumption amount allowed in one residential consumer.

Accordingly, when the user sets, to save an electricity cost, the reference power amount and uses the electric product not to exceed the reference power amount, it is possible to manage the electricity cost. However, while using electric products, there is a limit in managing the use of electric products by the user of his or her own in such a way that the power consumption amount is always less than the reference power amount.

Accordingly, a method of controlling electric products according to the present embodiment includes determining a power usage amount rate according to a difference between the power consumption amount and the reference power amount to minimize a load in an electricity cost according to the use of electric products not only when the power consumption amount is more than the reference power amount but also when the power consumption amount is less than the reference power amount and supplying power to electric products according to the determined power usage amount rate.

The power usage amount rate indicates a ratio of a usage amount of power stored in the electricity storage device to a usage amount of power supplied from a power supply source, and may be determined via an embodiment as follows.

First, when a power consumption amount is more than a reference power amount (t3-t4), the power usage amount rate may be determined in such a way that a power amount A needed to reach the reference power amount is supplied from the power supply source and a power amount B exceeding the reference power amount is supplied from the electricity storage device.

When operating electric products according to the power usage amount rate determined as described above, a power amount to which an electricity cost is charged such as an amount of power supplied from the power supply source, that is, a power consumption amount does not exceed the reference power amount set by the user, and also, stored power may be used for residual power needed to drive electric products, thereby driving electric products within an electricity cost range set by the user.

On the other hand, when the electricity storage device does not store electricity while driving electric products, since the amount of power stored in the electricity storage device becomes reduced by an amount of power supplied to electric products, it is shown in FIG. 23 that the stored power is reduced when the power amount B exceeding the reference power amount is supplied from the electricity storage device to electric products. Of course, when the power consumption amount is more than the reference power amount, the power usage amount rate may be determined different from the described above. That is, the power usage amount rate is determined in such a way that the amount of using the power stored in the electricity storage device is greater than the amount of using the power supplied from the power supply source, and power may be provided to electric products according thereto.

Since the power usage amount rate is determined in such a way that an area of B in FIG. 23 is greater than that of A therein, the power amount to which the electricity cost is charged such as the power amount provided from the power supply source, that is, the power consumption amount does not reach the reference power amount, thereby driving electric products within the electricity cost range set by the user.

Also, the power usage rate may be determined to supply only the power stored in the electricity storage device to electric products. In this case, the power amount stored in the electricity storage device may be reduced by A+B in FIG. 23.

Hereinafter, it will now be described to determine the power usage amount rate when the power consumption amount is less than the reference power amount.

When the power consumption amount is less than the reference power amount as shown in 0-t1, t1-t2, and t2-t3, since a power amount smaller than the reference power amount set by the user is consumed though supplying the power supplied from the power supply source to electric products, the power usage amount rate may be determined to supply only one of the power stored in the electricity storage device and the power supplied from the power supply source to electric products.

Also, the power usage amount rate is determined arbitrarily but it is permissible to determine the power usage amount of the power supplied from the power supply source to be greater than that of the power stored in the electricity storage device. This is for supplying a greater amount of the power stored in the electricity storage device in a time period when the power consumption amount is more than the reference power amount.

On the other hand, according to the present embodiment, an electricity cost charged while operating an electric product is metered, a power usage amount rate is determined based on the metered electricity cost and a reference price set by the user, and power may be supplied to the electric product depending on the determined power usage amount rate.

That is, the method according to the present embodiment may include steps of storing power stored in an electricity storage device in the electricity storage device, periodically determining an electricity cost according to consuming power supplied from a power supply source by an electric product, determining rates of an amount of using the power supplied from the power supply source and an amount of using the power stored in the electricity storage device according to a difference between a metered electricity cost and a preset reference price, and supplying power to the electric product according to the determined power usage amount rate. In this case, since the power usage amount rate may be determined as the embodiment described above, a detailed description thereof will be omitted.

On the other hand, a power usage amount rate may be determined not by periodically determining a power amount consumed by an electric product but by determining a power consumption amount estimated while operating the electric product. That is, the method according to the present embodiment may include steps of storing power stored in an electricity storage device in the electricity storage device, determining an estimated power consumption amount needed in driving an electric product, determining a power usage amount rate according to a difference between the estimated power consumption amount and a preset reference power amount, and supplying power to the electric product according to the determined power usage amount rate.

The step of determining an estimated power consumption amount is a step of, when the user inputs power to an electric product desired to be driven among electric products connected to an in-house network, estimating a power consumption amount needed in operating the electric product to which power is inputted.

The electric products connected via the in-house network generally include one or a plurality of operation modes and the user selects any one of the one or a plurality of operation modes, thereby executing unique functions set in operation modes of the electric product.

Accordingly, in case of an electric product including operation modes, the step of determining an estimated power consumption amount may be performed by, when the user inputs an operation mode to drive a certain electric product among a plurality of in-house electric products, gathering a power consumption amount set in a corresponding operation mode.

On the other hand, when the estimated power consumption amount is determined, the power usage amount rate may be determined based on the difference between the estimated power consumption amount and the reference power amount. When the estimated power consumption amount is more than the reference power amount, the power usage amount rate may be determined in such a way that power corresponding to the reference power amount is provided from the power supply source and power exceeding the reference power amount is provided from the power stored in the electricity storage device. That is, as shown in FIG. 23, the power usage amount rate may be determined based on a ratio of the power amount A needed in reaching the reference power amount to the power amount B needed exceeding the reference power amount.

However, when the estimated power consumption amount is less than the reference power amount, the power usage amount rate may be determined to supply only one of the power stored in the electricity storage device and the power supplied from the power supply source to the electric product.

Hereinafter, there will be described an embodiment of supplying power stored in an electricity storage device to an electric product without determining a power usage amount rate.

The method of controlling an electric product according to the present embodiment may include steps of storing power supplied from a power supply source in an electricity storage device, periodically metering an amount of consuming the power supplied from the power supply source by the electric product (a power consumption amount), and supplying the power stored in the electricity storage device to the electric product when the power consumption amount is more than a preset reference power amount and supplying the power provided from the power supply source to the electric product when the power consumption amount is less than the reference power amount.

Figure 24:
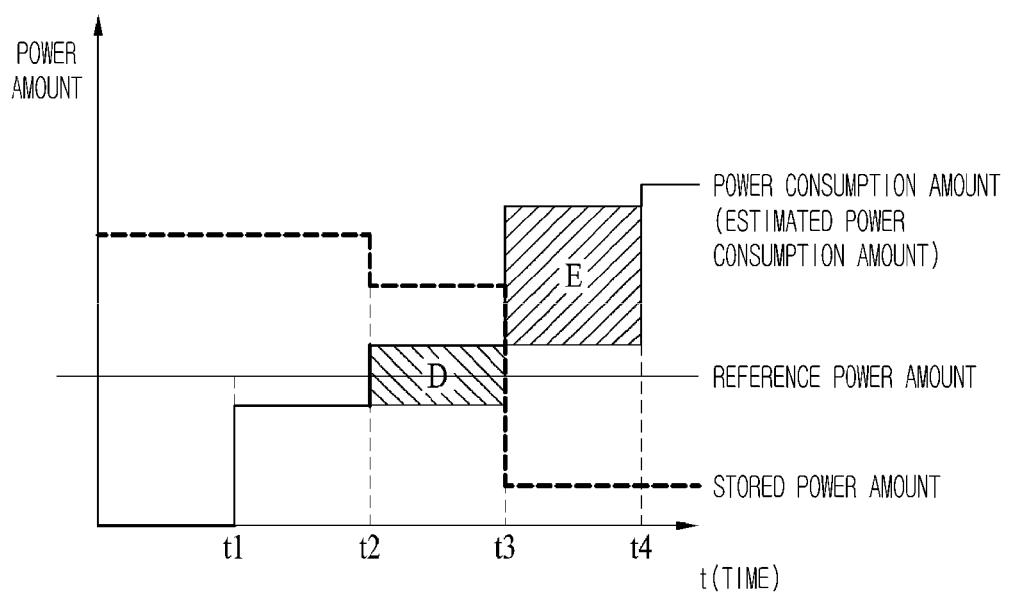
FIG. 24 is a view illustrating relations among the power consumption amount, the reference power amount, and the stored power amount related to the present embodiment.

FIG. 24 is a view illustrating relations among the power consumption amount, the reference power amount, and the stored power amount related to the present embodiment, in which a certain amount of power is stored in the electricity storage device via the step of storing electricity and the electric product is operated receiving the power from the power supply source. In this case, in the controlling method according to the present embodiment, the power consumption amount is compared with the reference power amount and the power stored in the electricity storage device is supplied to the electric product.

That is, when the power consumption amount is more than the reference power amount (t2-t3 and t3-t4), the power stored in the electricity storage device is supplied to the electric product. However, when the power consumption amount is less than the reference power amount (0-t1 and t1-t2), the power provided from the power supply source is supplied to the electric product. Accordingly, since the power provided from the power supply source is supplied to the electric product in time periods where the power consumption amount is less than the reference power amount, there is no change in an amount of the power stored in the electricity storage device.

However, passing through t2-t3 period where the power consumption amount is more than the reference power amount, the amount of the power stored in the electricity storage device becomes reduced by D. Since the power consumption amount shown in FIG. 24 is a value obtained by accumulating by lapse of time, the amount of the power supplied to the electric product in t2-t3 period is D.

In a method of controlling an electric product according to another embodiment, regardless of a power usage amount rate, power stored in an electricity storage device may be selectively supplied depending on a high price information period and a low price information period.

In other words, the method of controlling an electric product according to the present embodiment may include steps of storing power provided from a power supply source in the electricity storage device, determining whether power information corresponds to the high price information period or the low price information period, and supplying the power stored in the electricity storage device to the electric product in the high price information period and supplying the power provided from the power supply source to the electric product in the low price information period.

The power information is data including information regarding electricity cost varying with time. However, since the electricity cost is just an example, of the power information, there may be provided data in various forms capable of distinguishing the high price information period on which power demands are concentrated and the low price information period on which power demands are less concentrated, as the power information.

Figure 25:
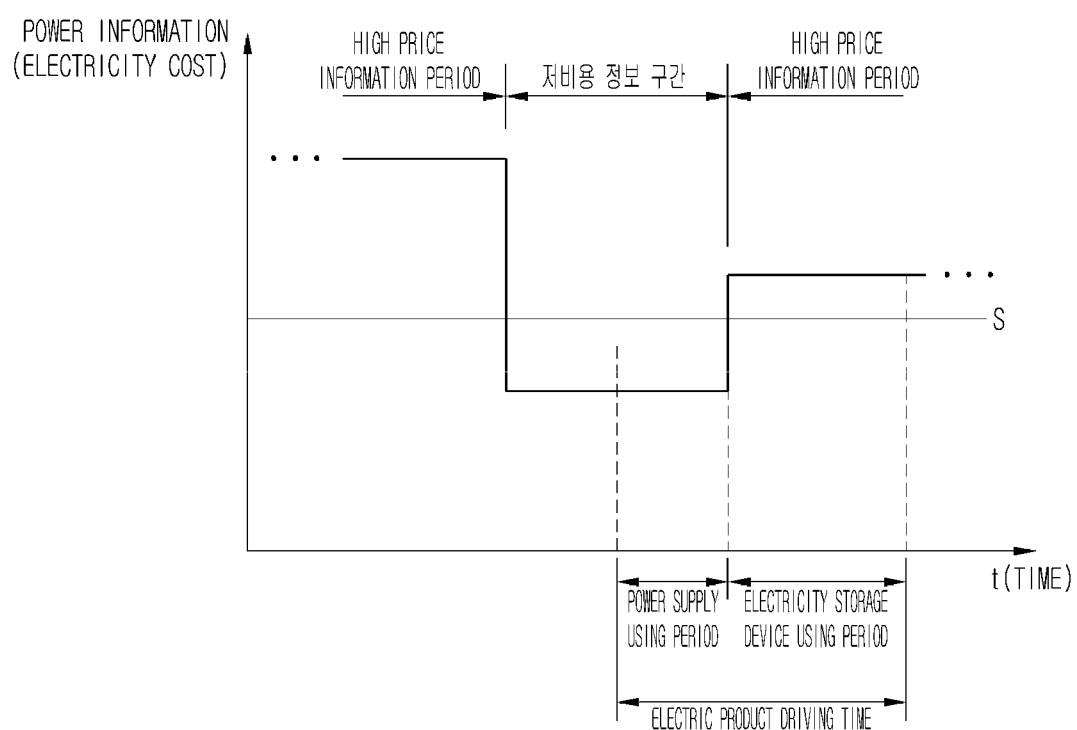
FIG. 25 is a view illustrating an example of determining the high price information period and the low price information period by using a certain reference value S.

FIG. 25 is a view illustrating an example of determining the high price information period and the low price information period by using a certain reference value S, in which a time period where an electricity cost for each time exceeds the reference value S is determined to be the high price information period and another time period where the electricity cost for each time is less than the reference value S is determined to be the low price information period.

In this case, in the controlling method according to the present embodiment, the power stored in the electricity storage device is supplied to the electric product when a present time of driving the electric product corresponds to the high price information period and the power provided from the power supply source is supplied to the electric product when the present time of driving the electric product corresponds to the low price information period.

Accordingly, generation of the electricity cost is prevented by driving the electric product using the power in the electricity storage device in the high price information period where the electricity cost is high and generation of the electricity cost is reduced by driving the electric product using the power provided from the power supply source in the low price information period where the electricity cost is low.

Figure 26:
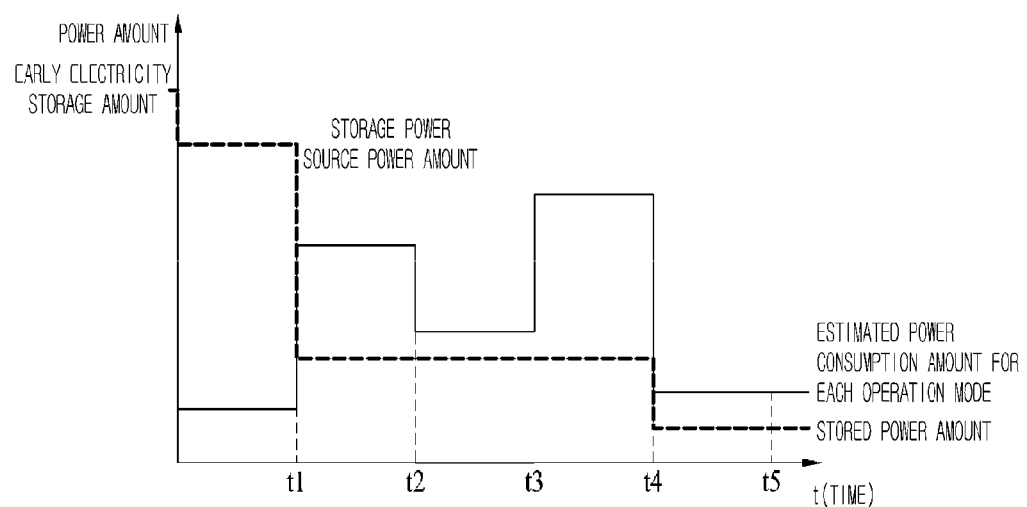
FIG. 26 relates to an embodiment of driving an electric product considering an estimated power consumption amount for each operation mode and an amount of power stored in an electricity storage device.

FIG. 26 relates to an embodiment of driving an electric product considering an estimated power consumption amount for each operation mode and an amount of power stored in an electricity storage device. A method of the present embodiment may include steps of storing power provided from a power supply source in an electricity storage device, determining an estimated power consumption amount for each operation mode of an electric product including one or more of operation modes, and performing an operation mode with an estimated power consumption amount less than an amount of the power stored in the electricity storage device by using the power stored in the electricity storage device and performing an operation mode with an estimated power consumption amount more than the amount of the power in the electricity storage device by using the power provided from the power supply source.

As shown in FIG. 26, the method includes a step of determining a power consumption amount estimated for each of a plurality of operation modes set in the electric product. The power consumption amount or the estimated power consumption amount shown in FIGS. 23 and 24 are values obtained by accumulating power consumption amounts according to the operation of the electric product, but the estimated power consumption amount for each operation mode shown in FIG. 26 is an estimated value of a power amount expected for each operation mode.

In this case, when the estimated power consumption amount for each operation mode is less than the amount of the power stored in the electricity storage device (0-t1, t1-t2, and t4-t5), the power stored in the electricity storage device is supplied to the electric product to perform a corresponding operation mode. When the estimated power consumption amount for each operation mode is more than the amount of the power stored in the electricity storage device (t2-t3 and t3-t4), the power provided from the power supply source is supplied to the electric product to perform a corresponding operation mode. Meanwhile, comparing the estimated power consumption amount for each operation mode with the amount of the power stored in the the estimated power consumption amount for each operation mode is less than the amount of the power stored in the electricity storage device may be performed whenever the each operation mode is finished.

There is provided another embodiment.

Figure 27:
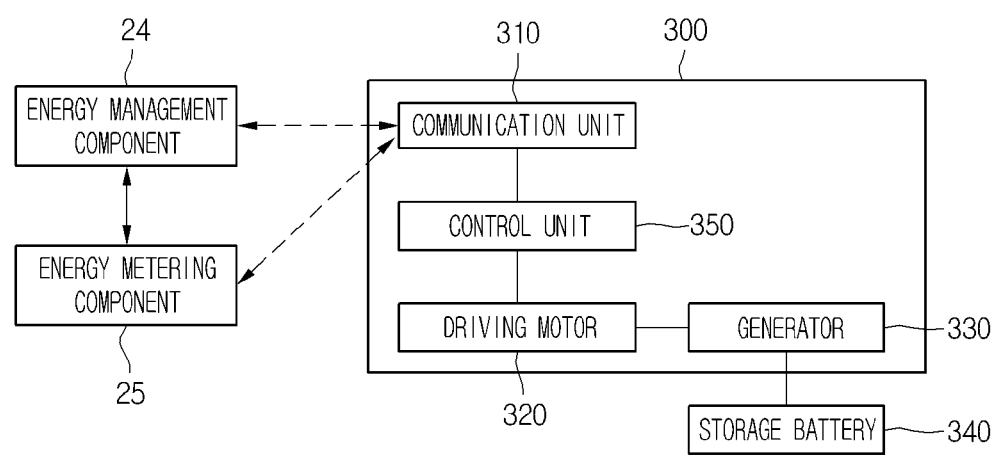
FIGS. 27 and 28 are block views illustrating a network system according to the present embodiment.
Figure 28:
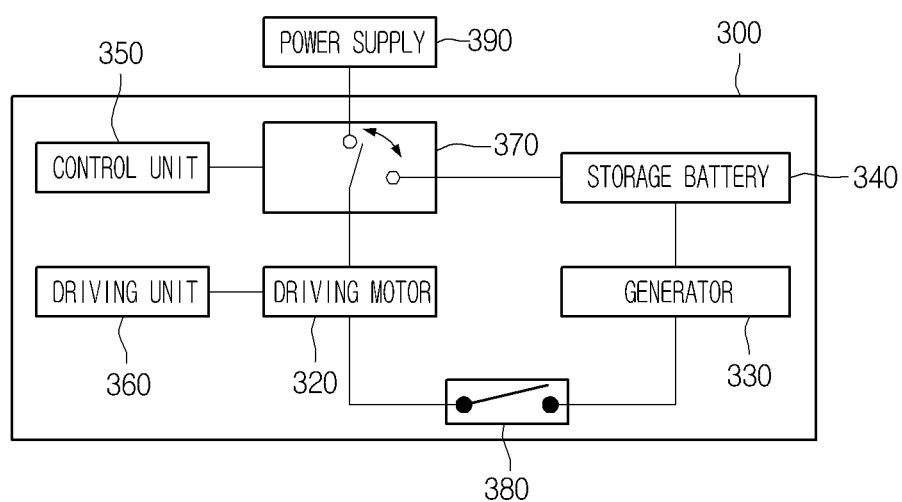

FIGS. 27 and 28 are block views illustrating a network system according to the present embodiment.

Referring to FIGS. 27 and 28, the network system according to the present embodiment includes an energy consumption component 300. The network system includes the energy metering component 25 recognizing one of energy information and additional information except the energy information, the energy management component 24 controlling or managing driving the energy consumption component 300 according to one of the energy information and the additional information, and a communication unit 310 communicating with one of the energy management component 24 and the energy metering component 25.

The energy consumption component 300 includes a driving motor 320 as a driving unit providing a driving force to drive one or more driving units 360 that are ones of subordinate components and energy consumption units constituting the energy consumption component 300, a generator 330 as an energy conversion unit generating an electric energy by using the driving force that is a dynamic energy of the driving motor 320, and a storage battery 340 as an energy storage unit storing the electric energy generated by the generator 330. The storage battery 340 may be provided inside the energy consumption component 300 or may be connected to the outside of the energy consumption component 300 to transmit electric power.

The network system further includes a power supply 390 for providing power to the energy consumption component 300. The power supply 390 is an electrical outlet provided in a house or a building and may be an alternative current AC supply unit.

The energy consumption component 300 includes a first switch 370 for selecting one of the power supply 390 and the storage battery 340 as a power source of the driving motor 320, a second switch 380 selectively connecting the driving motor 320 to the generator 330, and a control unit 350 controlling turning on/off of the first and second switches 370 and 380.

As an example, the energy consumption component 300 including the driving motor 320 may include a refrigerator. The driving motor 320 and the driving unit 360 may be a fan motor and a blowing fan. As another example, the energy consumption component 300 may include a washing machine. Also, the driving motor 320 and the driving unit 360 a motor for generating a rotational force and a drum rotated by the motor, the drum being a storage unit for storing wash water.

As another example, the energy consumption component 300 may include a cooking appliance. Also, the driving motor 320 and the driving unit 360 may be a fan motor and a blowing fan for blowing heated air. As another example, the energy consumption component 300 may include an air cleaner. Also, the driving motor 320 and the driving unit 360 may be a fan motor and a blowing fan for sucking or discharging air.

In detail, the communication unit 310 may receive the information, that is, one of the energy information and the additional information except the energy information from one of the energy management component 24 and the energy metering component 25. When the information is recognized as to restrict driving the energy consumption component 300, for example, when the information is recognized as energy cost information exceeding a preset reference value (as one of a high price information period and an on-peak time period), the energy consumption component 300 may be controlled to reduce one of a power amount and an electricity cost.

When the information is recognized as the high price information period, driving of the driving motor 320 and the driving unit 360 using power of the power supply 390 may be restricted. In this case, the first switch 370 operates in such a way that the driving motor 320 receives power from the storage battery 340.

Meanwhile, the power of the storage battery 340 may not only allow one of the driving motor 320 and the driving unit 360 to be driven but also allow another subordinate component that is the energy consumption unit constituting the energy consumption component 300 to be driven. As an example, the power of the storage battery 340 may be used to drive a defrosting heater of a refrigerator or to turn on an internal light inside the refrigerator. As an example, the power of the storage battery 340 may be used to turn on a light provided in a display of one electric product or to operate a clock.

On the contrary, when the information is not recognized as the high price information period, driving of the driving motor 320 and the driving unit 360 may be performed by the power of the power supply 390. In this case, the first switch 370 operates in such a way that the driving motor 320 is connected to the power supply 390.

Also, the second switch 380 operates in such a way that the driving motor 320 is connected to the generator 330. In a process of operating the driving motor 320, at least a part of the rotational force of the driving motor 320 may be used to drive the generator.

There will be described functions of the network system in brief.

When it is not recognized as the high price information period based on information transferred from one of the energy management component 24 and the energy metering component 25, as an example, recognized as one of the low price time period and an off-peak time period, the first switch 370 operates to connect the driving motor 320 to the power supply 390 and to connect the second switch 380 to the driving motor 320.

Accordingly, the driving motor 320 is driven by the power of the power supply 320 and a dynamic energy of the driving motor 320 may be inputted to the generator 330 and be converted into an electrical energy. Also, the electrical energy may be stored in the storage battery 340. That is, in the low price information period, the electrical energy may be generated and stored by using the dynamic energy generated in a process of driving one unit included in the energy consumption component 300.

On the other hand, when it is recognized as the on-peak time period based on the information transferred from one of the energy management component 24 and t he energy metering component 25, the control unit 350 may control the first switch 370 in order to connect the driving motor 320 to the storage battery 340 and may turn off the second switch.

Accordingly, the power of the storage battery 340 may be used to drive the driving motor 320. However, the power of the storage battery 340 may be used to drive another subordinate component such as the energy consumption unit of the energy consumption component 300. According to a configuration as described above, when one of the energy information and the additional information except the energy information exceeds a preset reference value, an energy cost may be reduced by reducing one of a power amount consumed by the energy consumption component 300 and a power supply amount of the power supply 390.

Figure 29:
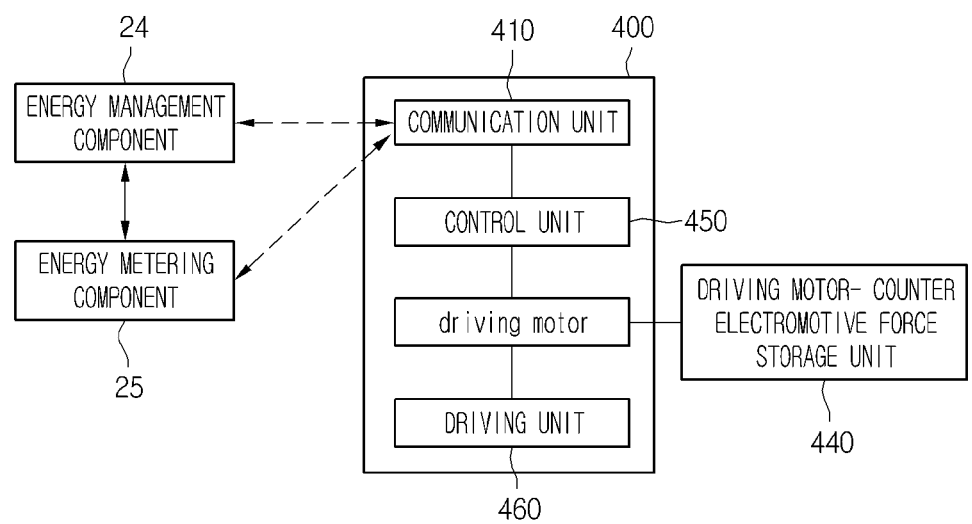
FIG. 29 is a block view illustrating a network system according to another embodiment.
Figure 30:
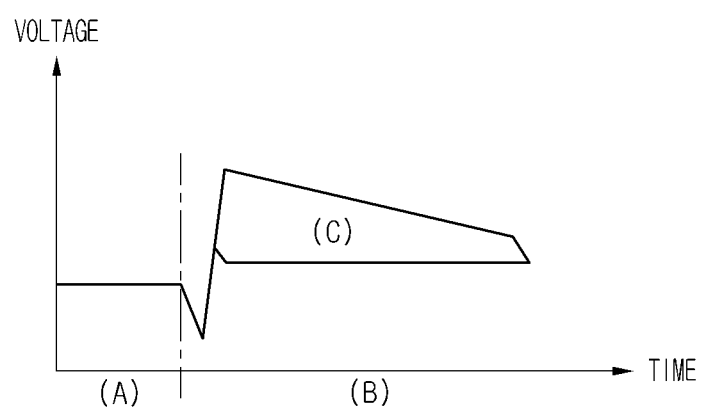
FIG. 30 is a graph illustrating an amount of energy stored in one unit of an energy consumption component 400 according to another embodiment.

FIG. 29 is a block view illustrating a network system according to another embodiment, and FIG. 30 is a graph illustrating an amount of energy stored in one unit of an energy consumption component 400 according to another embodiment.

Referring to FIGS. 29 and 30, the network system including the energy consumption component 400 includes the energy metering component 25 recognizing one of energy information and additional information except the energy information, the energy management component 24 managing and controlling driving of the energy consumption component 400 according to one of the energy information and the additional information, and a communication unit 410 communicating with one of the energy management component 24 and the energy metering component 25.

The energy consumption component 400 includes a driving motor 420 providing a driving force to drive one or more driving units 460 that are ones of subordinate components and energy consumption units constituting the energy consumption component 400, a counter electromotive force storage unit 440 storing a counter electromotive force of the driving motor 420, and a control unit 460 controlling driving of the driving motor 420. Examples of the driving motor 420 and the driving unit 460 are similar to the description with reference to FIG. 28 and will be omitted.

The counter electromotive force of the driving motor 420 is an opposite load against an electromotive force generated in a process of driving a motor and may be generated when the motor stops. For example, in a process of spin-drying with a high speed in a washing machine including a permanent magnet motor, when the motor stops, a counter electromotive force may be generated. Also, the counter electromotive force may be stored in the counter electromotive force storage unit 440 and be used as power in a certain period. The counter electromotive force storage unit 440 may be considered corresponding to the storage battery in FIG. 28. The stop of the driving motor 420 may be performed by cutting off power of the energy consumption component 400 or an operation of the user.

Referring to FIG. 30, a voltage of the driving motor 420 is uniformly maintained in A period in which the driving motor 420 is driven and the voltage is rapidly increased after a decrease in a short time and a counter electromotive force is generated in B period in which the driving motor 420 stops. A part shown as a certain area C may be designated as power by the counter electromotive force.

In detail, the communication unit 410 may receive the information, that is, one of the energy information and the additional information except the energy information, from one of the energy management component 24 and the energy metering component 25. When the information is recognized to restrict driving of the energy consumption component 400, for example, when the information is recognized as a high price information period, the energy consumption component may be controlled to reduce one of a power amount and an electricity cost.

That is, when the information is recognized as the high price information period, driving of the energy consumption component 400 using a power supply (refer to the description of FIG. 28) may be restricted. Also, power of the counter electromotive force storage unit 440 may be used to drive the energy consumption component 400. Of course, the power of the counter electromotive force storage unit 440 may be used not only to drive the energy consumption component 400 but also to drive other subordinate components such as energy consumption units constituting the energy consumption component 400.

There will be described functions of the network system according to the present embodiment in brief.

When the energy consumption component 400 is operated, in a process where the driving motor 420 stops after driving, there is generated a counter electromotive force. Also, the generated counter electromotive force is stored in the counter electromotive force storage unit 440. On the other hand, when it is recognized as an on-peak time period based on the information transferred from one of the energy management component 24 and the energy metering component 25, power stored in the counter electromotive storage unit 440 may be used to drive one of the energy consumption component 400 and one unit constituting the energy consumption component 400.

According to a configuration as described above, when one of the energy information and the additional information except the energy information exceeds a preset reference value, an energy cost may be reduce by reducing one of a power amount consumed by the energy consumption component 400 and a power supply amount of the power supply.

There is provided another embodiment.

Figure 31:
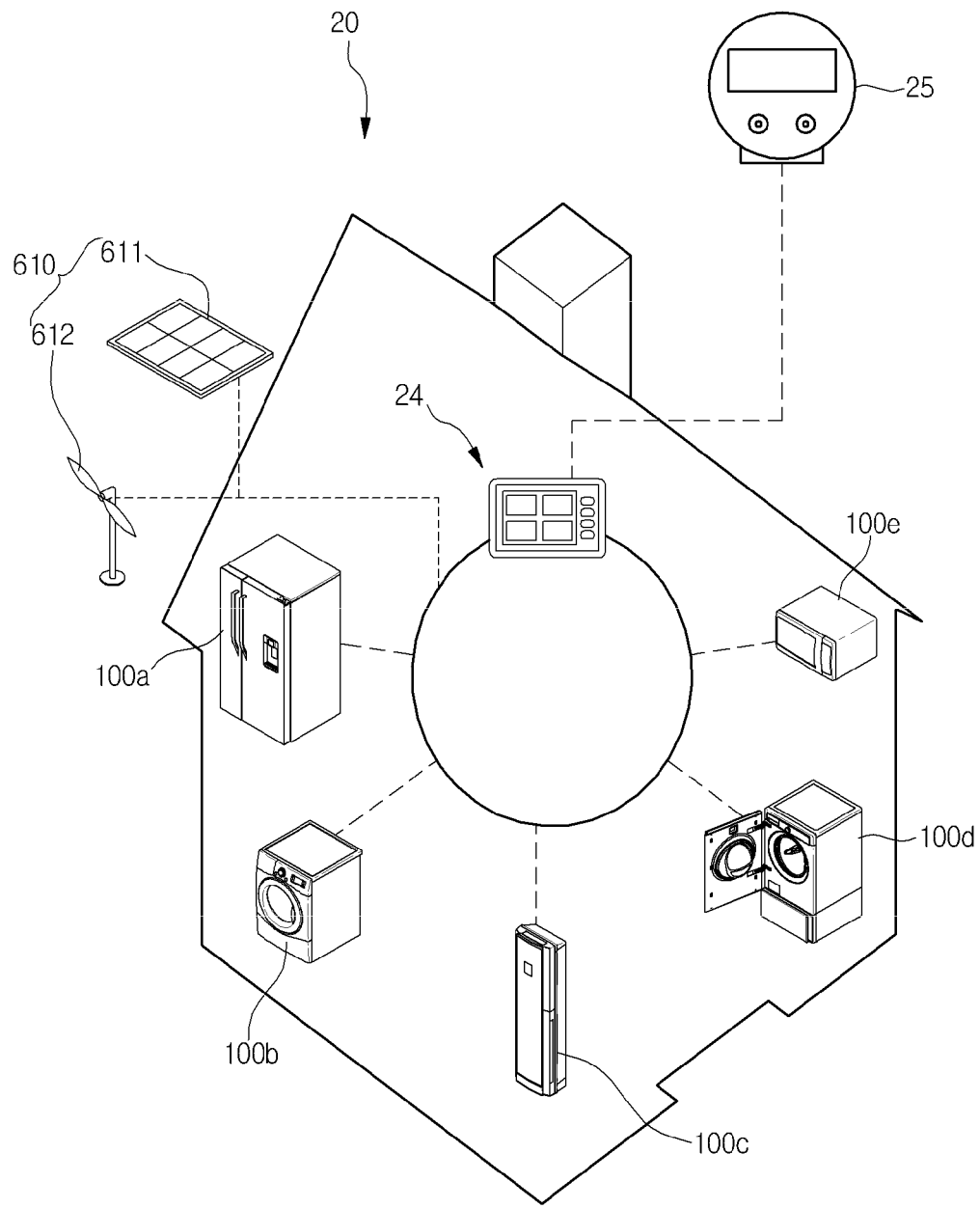
FIG. 31 is a schematic view illustrating the home area network 20 of the network system according to another embodiment.
Figure 32:
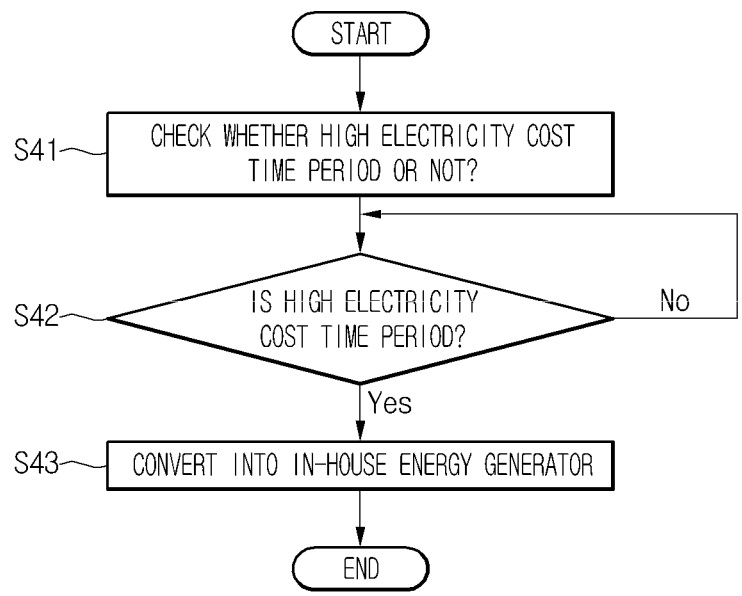
FIG. 32 is a flowchart illustrating a control method of converting an energy generator according to whether it is a high price time period of an electricity cost or not in the network system.
Figure 33:
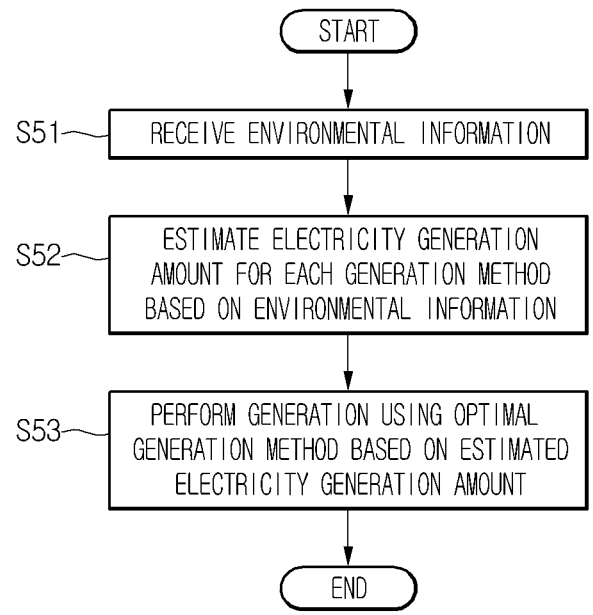
FIG. 33 is a flowchart illustrating a control method of performing electricity generation using an optimal generation method according to environment information in the network system.

FIG. 31 is a schematic view illustrating the home area network 20 of the network system according to another embodiment. FIG. 32 is a flowchart illustrating a control method of converting an energy generator according to whether it is a high price time period of an electricity cost or not in the network system. FIG. 33 is a flowchart illustrating a control method of performing electricity generation using an optimal generation method according to environment information in the network system.

Referring to FIG. 31, the home area network 20 includes the energy metering component 25 metering one or more of power and an electricity cost supplied to each residential consumer from the utility network 10, for example, a smart meter, and the energy management 24 connected to the energy metering component 25 and electric products and controlling the operations thereof. In this case, the smart meter may meter the entire energy consumption amount consumed by the home area network 20, that is, the whole electricity consumption amount.

The energy management component 24 is connected to an electric product as the energy consumption component 26, that is, one of the washing machine 100*a*, the refrigerator 100*b*, the air cleaner 100*c*, the drying machine 100*d*, and the cooking appliance 100*e* and may two-way communicate therewith.

Also, the home area network 20 includes a in-house energy generator 610 to generate energy supplied to the energy consumption component 26. In this case, the in-house energy generator 610 includes one or more eco-friendly energy generators 611 and 612. The eco-friendly energy generators 611 and 612 may be a solar generator using solar irradiation and a wind power generator using wind power, respectively. Of course, the eco-friendly energy generators 611 and 612 may be various generators that are eco-friendly such as a water power generator using water power, a geothermal heat generator using geothermal heat, and a fuel cell. The in-house energy generator 610 is connected to provide energy to the energy consumption component 26.

Meanwhile, an electricity cost for each residential consumer is charged as a price per unit consumption amount, the electricity cost per unit consumption amount becomes higher in a time period in which a power consumption amount is rapidly increased, and the electricity cost per unit consumption amount becomes lower in a midnight in which a power consumption amount is relatively reduced.

The electricity cost per unit consumption amount for each time period may be received being included in information regarding energy received from the energy management component 24. The time period in which the electricity cost per unit consumption amount is expensive may be referred to as a high electricity cost time period. The high electricity cost time period may indicate an on-peak time.

The network system may change into a suitable energy generator 610 according to whether it is the high electricity cost time period or not, thereby providing economical electric power consumption.

For example, referring to FIG. 32, while using the electric product by receiving common electricity, the energy management component 24 may check whether it is the high electricity cost time period or not, based on received information regarding on an energy cost (S41). In this case, it may be determined based on a time period in which an electricity cost exceeds a reference price whether it is the high electricity cost time period or not, based on the energy cost information. That is, the time period the electricity cost exceeds the reference price may be considered as the high electricity cost time period.

Also, when reaching the high electricity cost time period (S42), the energy generator supplying electricity to the electric product may be converted into the in-house energy generator 610 (S43). In detail, when reaching the high electricity cost time period while using the common electricity, the energy generator supplying electricity to the electric product may be converted to one of the solar generator 611 and the wind power generator 612. That is, when reaching the high electricity cost time period, the energy generator supplying the electricity to the electric product is converted into one of the in-house energy generator 610 and the eco-friendly energy generators 611 and 612.

Meanwhile, the additional information except the energy information may be received by the energy management component 24 together with the energy information. The additional information may include environmental information including one or more of a temperature, a wind speed, an air volume, a solar radiation amount, and precipitation.

The network system may be controlled to perform generation using an optimal generation method based on the environmental information. For example, referring to FIG. 33, the energy management component 24 may receive the environmental information in real time (S51). The environmental information includes information regarding various environmental factors such as a temperature, a wind speed, an air volume, a solar radiation amount, and precipitation capable of having effects on generation efficiency and performance of the eco-friendly energy generators 611 and 612.

Also, the energy management component 24 may predict an electricity generation amount for each generation method based on the environmental information (S52). That is, the energy management component 24 may calculate an electricity generation amount using a solar generation method based on solar irradiation information and may calculate an electricity generation amount using a power wind generation method based on one of a wind speed and an air volume.

Also, the energy management component 24 converts the energy generator supplying electricity to the electric product in order to perform generation using the optimal generation method based on the estimated electricity generation amount for each generation method (S53). In detail, based on the estimated electricity generation amount for each generation method, the energy generator 610 is converted in order to perform the generation using a generation method providing an electricity generation amount corresponding to a maximum amount.

For example, when an electricity generation amount using the solar generation method is estimated to be greater than that of the wind power generation method, the solar generator 611 is used to supply electricity to the electric product and the wind power generator 612 may stop an operation thereof. Accordingly, considering environmental conditions, the generation may be performed by using a generation method acquiring the greatest amount of electricity. That is, the user may carry on more economic electricity consumption.

INDUSTRIAL APPLICABILITY

According to the present embodiment, it is possible to effectively manage energy sources and to reduce an electricity cost. Thus, its industrial applicability is very high.

The invention claimed is:

1. A network system comprising:
one or more of an energy receiving component receiving energy and an energy management component controlling the energy receiving component, wherein the energy receiving unit or the energy management unit receives information related to energy cost, and an energy usage amount or a usage cost of when the one or more of the energy receiving component receiving energy and the energy management component is controlled on basis of at least information related to energy cost is less than that of when the one or more of the energy receiving component receiving energy and the energy management component is controlled without basis of the at least information related to energy cost; and
an energy storage component for storing energy to be supplied to one of the energy receiving component and the energy management component,
wherein a ratio of an amount of the energy stored in the energy storage component to an amount of energy supplied from an energy supply component is determined based on a difference between an energy consumption amount and a reference energy amount and a difference between an energy consumption cost and a reference energy cost, and
the energy is supplied to the energy receiving component according to the determined ratio.

2. The network system of claim 1, wherein the energy stored in the energy storage component is used to drive one or more components constituting the energy receiving component when power supplied to the energy receiving component is restricted.

3. The network system of claim 2, further comprising the energy supply component supplying the energy to the energy receiving component,
wherein the supplying energy of the energy supply component varies based on the information related to energy cost.

4. The network system of claim 3, wherein the energy receiving component is selectively connected to one of the energy supply component and the energy storage component, based on whether the information related to energy cost is high price information or not.

5. The network system of claim 2, wherein the energy stored in the energy storage component is supplied to the one or more of the energy receiving component receiving energy and the energy management component when the information related to energy cost is recognized as high price information.

6. The network system of claim 3, wherein the energy from the energy supply component is supplied to the one or more of the energy receiving component receiving energy and the energy management component when the information related to energy cost is not recognized as high price information.

7. The network system of claim 2, wherein the one or more of the energy receiving component receiving energy and the energy management component is one of a communication unit, provided to allow a communication with one of an energy metering component and the energy management component, and a display unit displaying an operating status of the energy receiving component.

8. The network system of claim 2, wherein the restriction of supplying energy to the energy receiving component corresponds to one of cutting off the supplying energy and a supplying standby energy source to the energy receiving component.

9. The network system of claim 3, wherein at least a part of the energy supplied from the energy supply component is able to be stored in the energy storage component, and
wherein the energy receiving component consumes the energy supplied from one of the energy supply component and the energy storage component and one of an energy consumption amount and an energy consumption cost of the energy receiving component is metered.

10. The network system of claim 1, wherein, when the energy consumption amount is greater than the reference energy amount or the energy consumption cost is greater than the reference energy cost, an energy consumption rate is determined wherein energy corresponding to the reference energy amount is supplied from the energy supply component and energy exceeding the reference energy amount is supplied from the energy storage component.

11. The network system of claim 1, wherein, when the energy consumption amount is less than the reference energy amount or the energy consumption cost is less than the reference energy cost, an energy consumption rate is determined wherein only the energy stored in the energy storage component is supplied to the energy receiving component or the energy supplied from the energy supply component is supplied to the energy receiving component.

12. The network system of claim 1, wherein, when the energy consumption amount is greater than the reference energy amount or the energy consumption cost is greater than the reference energy cost, an energy consumption rate is determined wherein a usage amount of the energy stored in the energy storage component is greater than a usage amount of the energy supplied from the energy supply component.

13. The network system of claim 1, wherein, when the energy consumption amount is less than the reference energy amount or the energy consumption cost is less than the reference energy cost, an energy consumption rate is determined wherein a usage amount of the energy supplied from the energy supply component is greater than a usage amount of the energy stored in the energy storage component.

14. The network system of claim 1, wherein the information related to energy cost comprises high price information and low price information divided depending on a preset reference price, and
wherein an energy storage price of storing energy in the energy storage component is compared with the preset reference price and the energy is stored when the energy storage price is less than the preset reference price.

15. The network system of claim 14, wherein both a storage start time and a storage end time of storing energy in the energy storage component belong to a time period of the low price information.

16. The network system of claim 14, wherein a storage start time of storing energy in the energy storage component belongs to a time period of the high price information and a storage end time thereof belongs to a time period of the low price information.

17. The network system of claim 14, wherein a storage start time of storing energy in the energy storage component belongs to a time period of the low price information and a storage end time thereof belongs to a time period of the high price information.

18. The network system of claim 14, wherein both a storage start time and a storage end time of storing energy in the energy storage component belong to a time period of the high price information.

19. The network system of claim 14, wherein the preset reference price is determined based on one or more of energy storage allowable money amount and energy information of a time period comprising an estimated driving time and an energy consumption amount of the energy receiving component.

20. The network system of claim 1, wherein the energy receiving component comprises:
a driving unit providing a driving force; and
an energy storage unit storing energy generated from the driving unit based on the information related to energy cost.

21. The network system of claim 20, wherein the energy receiving component comprises a first switch to allow the energy in the energy storage unit to be supplied to the energy receiving component when the information related to energy cost is high price information.

22. The network system of claim 20, wherein the energy receiving component comprises:
an energy conversion unit generating other energy from one energy generated in the driving unit when the information related to energy cost is low price information; and
a second switch selectively connecting the driving unit to the energy conversion unit.

23. The network system of claim 20, wherein the energy generated from the driving unit is one of a dynamic energy of the driving unit and a counter electromotive force of the driving unit.

24. The network system of claim 23, wherein the dynamic energy of the driving unit is a rotational force provided to drive the driving unit.

25. The network system of claim 24, wherein the driving unit is a fan motor.

26. The network system of claim 23, wherein the counter electromotive force of the driving unit occurs when driving of the driving unit stops.

27. The network system of claim 1, further comprising:
a common use energy generator generating common use energy; and
an eco-friendly energy generator generating eco-friendly energy,
wherein the energy receiving component receives, based on one of energy information and additional information, energy from one of the common use energy generator and the eco-friendly energy generator.

28. The network system of claim 27, wherein the additional information is one of environmental information, program update information, time information, information regarding an operation or status of each component, habit information of a user using an energy consumption component.

29. The network system of claim 28, wherein the environmental information comprises one or more of a temperature, a wind speed, an air volume, a solar radiation amount, and precipitation.

30. The network system of claim 28, wherein the energy management component predicts an electricity generation amount for each electricity generation method based on the environmental information.

31. The network system of claim 30, wherein the electricity generation method comprises one or more of a solar generation method, a wind power generation method, and a water power generation method.

32. The network system of claim 30, wherein generation of electricity is performed by one generation method with an estimated generation amount corresponding to a maximum amount.

33. The network system of claim 27, wherein, when the information related to energy cost corresponds to high price information, the energy generator supplying energy to the energy receiving component is changed from the common use energy generator to the eco-friendly energy generator.

34. A network system comprising:
one or more of an energy receiving component receiving energy and an energy management component controlling the energy receiving component, wherein the energy receiving unit or the energy management unit receives information related to energy cost, and an energy usage amount or a usage cost of when the one or more of the energy receiving component receiving energy and the energy management component is controlled on basis of at least information related to energy cost is less than that of when the one or more of the energy receiving component receiving energy and the energy management component is controlled without basis of the at least information related to energy cost; and
an energy storage component for storing energy to be supplied to one of the energy receiving component and the energy management component,
wherein, based on the information related to energy cost, the energy stored in the energy storage component is supplied to the energy receiving component in a high price information period, and
wherein energy supplied from an energy supply component is supplied to the energy receiving component in a low price information period,
wherein a ratio of an amount of the energy stored in the energy storage component to an amount of the energy supplied from the energy supply component is based on a difference between an energy consumption amount and a reference energy amount and a difference between an energy consumption cost and a reference energy cost, and
the energy is supplied to the energy receiving component according to the determined ratio.

35. A network system comprising:
one or more of an energy receiving component receiving energy and an energy management component controlling the energy receiving component, wherein the energy receiving unit or the energy management unit receives information related to energy cost, and an energy usage amount or a usage cost of when the one or more of the energy receiving component receiving energy and the energy management component is controlled on basis of at least information related to energy cost is less than that of when the one or more of the energy receiving component receiving energy and the energy management component is controlled without basis of the at least information related to energy cost; and
an energy storage component for storing energy to be supplied to one of the energy receiving component and the energy management component,
wherein, among operation modes of the energy receiving component, an operation mode with an estimated power consumption amount less than an amount of the energy stored in the energy storage component is performed using the energy stored in the energy storage component, and
wherein an operation mode with an estimated power consumption amount more than the amount of the energy stored in the energy storage component is performed using energy supplied from an energy supply component,
wherein a ratio of an amount of the energy stored in the energy storage component to an amount of the energy supplied from the energy supply component is determined based on a difference between an energy consumption amount and a reference energy amount and a difference between an energy consumption cost and a reference energy cost, and
the energy is supplied to the energy receiving component according to the determined ratio.

* * * * *